(12) United States Patent
Fukazawa et al.

(10) Patent No.: US 12,322,050 B2
(45) Date of Patent: Jun. 3, 2025

(54) INFORMATION PROCESSING APPARATUS AND INFORMATION PROCESSING METHOD

(71) Applicant: SONY GROUP CORPORATION, Tokyo (JP)

(72) Inventors: Ryo Fukazawa, Tokyo (JP); Hirotake Ichikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 74 days.

(21) Appl. No.: 18/003,373

(22) PCT Filed: Jun. 18, 2021

(86) PCT No.: PCT/JP2021/023153
§ 371 (c)(1),
(2) Date: Dec. 27, 2022

(87) PCT Pub. No.: WO2022/004422
PCT Pub. Date: Jan. 6, 2022

(65) Prior Publication Data
US 2023/0148185 A1 May 11, 2023

(30) Foreign Application Priority Data
Jul. 2, 2020 (JP) .................................. 2020-114866

(51) Int. Cl.
*G06T 19/20* (2011.01)
*G02B 27/01* (2006.01)
(Continued)

(52) U.S. Cl.
CPC ........ *G06T 19/006* (2013.01); *G02B 27/0172* (2013.01); *G06T 19/20* (2013.01); *G06T 2219/2016* (2013.01)

(58) Field of Classification Search
CPC ................... G06T 19/20; G06T 19/006; G06T 2219/2016; G06T 5/70; G06T 2210/62;
(Continued)

(56) References Cited

U.S. PATENT DOCUMENTS

2013/0289875 A1* 10/2013 Kumon ................ G01C 21/365
701/533
2019/0088021 A1* 3/2019 Tanaka ..................... G09G 5/00
(Continued)

FOREIGN PATENT DOCUMENTS

JP 5346115 B1 * 11/2013 ............. A61B 5/024
JP 2017-041019 A 2/2017
(Continued)

OTHER PUBLICATIONS

International Search Report and Written Opinion of PCT Application No. PCT/JP2021/023153, issued on Jul. 13, 2021, 11 pages of ISRWO.

*Primary Examiner* — Wesner Sajous
(74) *Attorney, Agent, or Firm* — CHIP LAW GROUP

(57) ABSTRACT

The present technology relates to an information processing apparatus, an information processing method, and a recording medium which can more appropriately arrange a virtual object. By providing the information processing apparatus including a control unit that restricts a size of an environment map data in which a virtual object is arranged, on the basis of a detection result by a sensor of a real space associated with the environment map data, it is possible to more appropriately arrange a virtual object. For example, the present technology can be applied to an AR HMD.

17 Claims, 23 Drawing Sheets

(51) Int. Cl.
*G06F 3/01* (2006.01)
*G06F 3/048* (2013.01)
*G06F 3/14* (2006.01)
*G06T 15/20* (2011.01)
*G06T 19/00* (2011.01)
*G09G 5/10* (2006.01)

(58) Field of Classification Search
CPC ... G06T 15/20; G06T 2219/024; G01C 21/36; G01C 21/365; G01C 21/3632; G02B 27/0172; G02B 27/0179; G02B 27/017; G06F 3/011; G06F 3/01; G06F 3/147; G06F 3/1454; G06F 3/013; G06F 3/017; G06F 3/04845; G06F 3/04842; G06F 3/04815; G06F 3/0346; G09G 5/00; G09G 5/373; G09G 5/38; G09G 5/377; G09G 5/10; G09G 2320/066; G09G 2320/0261; G09G 2320/0626; G09G 2340/10; G09G 2340/0492
See application file for complete search history.

(56) References Cited

U.S. PATENT DOCUMENTS

| | | | |
|---|---|---|---|
| 2021/0333979 A1* | 10/2021 | Rockel | G06F 3/04815 |
| 2022/0229534 A1* | 7/2022 | Terre | G06F 3/04815 |
| 2023/0152935 A1* | 5/2023 | Mckenzie | G06F 3/011 |
| | | | 715/733 |
| 2024/0184356 A1* | 6/2024 | Pastrana Vicente | G06F 3/017 |

FOREIGN PATENT DOCUMENTS

| | | |
|---|---|---|
| JP | 2017-181666 A | 10/2017 |
| WO | 2009/060880 A1 | 5/2009 |
| WO | 2012/090325 A1 | 7/2012 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/023153 filed on Jun. 18, 2021, which claims priority benefit of Japanese Patent Application No. JP 2020-114866 filed in the Japan Patent Office on Jul. 2, 2020. Each of the above-referenced applications is hereby incorporated herein by reference in its entirety.

TECHNICAL FIELD

The present technology relates to an information processing apparatus, an information processing method, and a recording medium, and particularly relates to an information processing apparatus, an information processing method, and a recording medium which can more appropriately arrange a virtual object.

BACKGROUND ART

In recent years, research and development for providing a new experience by combining a real world and a virtual world, such as augmented reality (AR) have been actively conducted.

For example, Patent Document 1 discloses a technique in which priority of information associated with information regarding virtual objects arranged in contents to be displayed is adjusted on the basis of a history of actions taken by a user in a virtual space in which a plurality of virtual objects is arranged.

CITATION LIST

Patent Document

Patent Document 1: Japanese Patent Application Laid-Open No. 2017-41019

SUMMARY OF THE INVENTION

Problems to be Solved by the Invention

By the way, in a case where an environment in which the virtual object is arranged is a real environment around the user, it is necessary to arrange the virtual object in various real environments. Therefore, it is required to more appropriately arrange virtual objects in various real environments.

The present technology is made in view of such a situation, and can more appropriately arrange a virtual object.

Solutions to Problems

An information processing apparatus according to an aspect of the present technology is an information processing apparatus including a control unit that restricts a size of an environment map data in which a virtual object is arranged, on the basis of a detection result by a sensor of a real space associated with the environment map data.

An information processing method according to another aspect of the present technology is an information processing method including restricting a size of an environment map data in which a virtual object is arranged, on the basis of a detection result by a sensor of a real space associated with the environment map data by an information processing apparatus.

A recording medium according to another aspect of the present technology is a recording medium in which a program is recorded, the program causing a computer to function as a control unit that restricts a size of an environment map data in which a virtual object is arranged, on the basis of a detection result by a sensor of a real space associated with the environment map data.

In the information processing apparatus, the information processing method, and the recording medium according to the aspects of the present technology, the size of the environment map data in which the virtual object is arranged is restricted on the basis of the detection result by the sensor of the real space associated with the environment map data.

The information processing apparatus according to the aspect of the present technology may be an independent apparatus, or may be an internal block constituting one apparatus.

MODE FOR CARRYING OUT THE INVENTION

1. Embodiments of Present Technology

In a device such as an optical see-through type head mounted display (HMD), an application corresponding to augmented reality (AR) (hereinafter, also referred to as AR application) can provide the user experience in which virtual and reality are combined. In the following description, the optical see-through type HDM that can provide the user experience using AR is referred to as an AR HMD, and the device such as an AR HMD is also referred to as an AR device.

In order to realize such an augmented real environment, a virtual item or a user interface (UI) is arranged using shape information of the environment and attribute information of a floor, a wall, and the like, or a virtual character freely acts in the environment.

Figure 1:
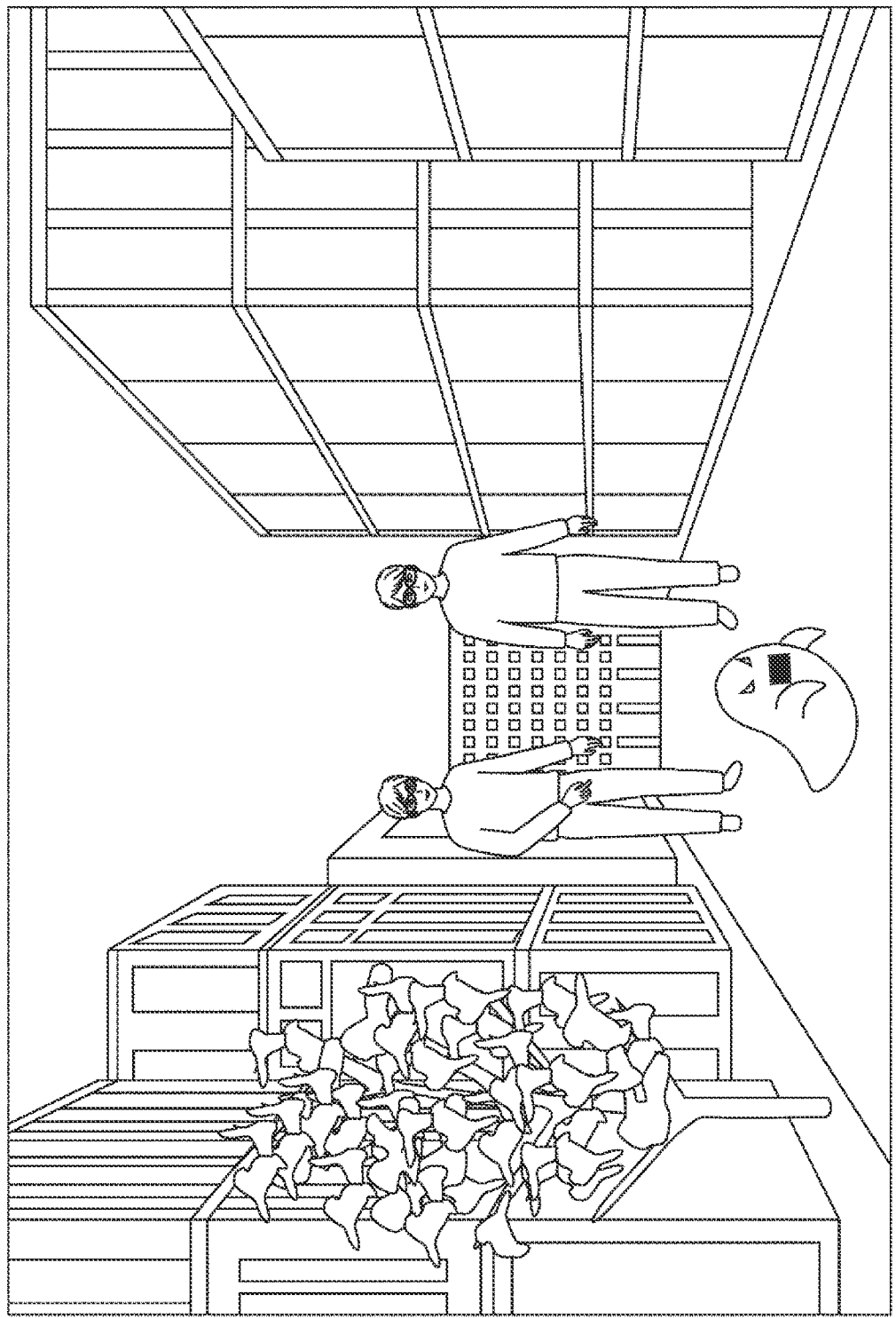
FIG. 1 is a diagram illustrating an example of an AR application.

For example, in FIG. 1, a virtual ghost video is superimposed on the real environment around the user wearing the AR HMD by the AR application. The virtual ghost moves away from the user on a passage in the environment, or comes out of a gap between buildings according to the environment.

The technology of game AI is applied to realize action determination and arrangement of virtual objects according to such an environment. A route search using a navigation mesh is used to generate motion of the virtual object in the environment.

Figure 2:
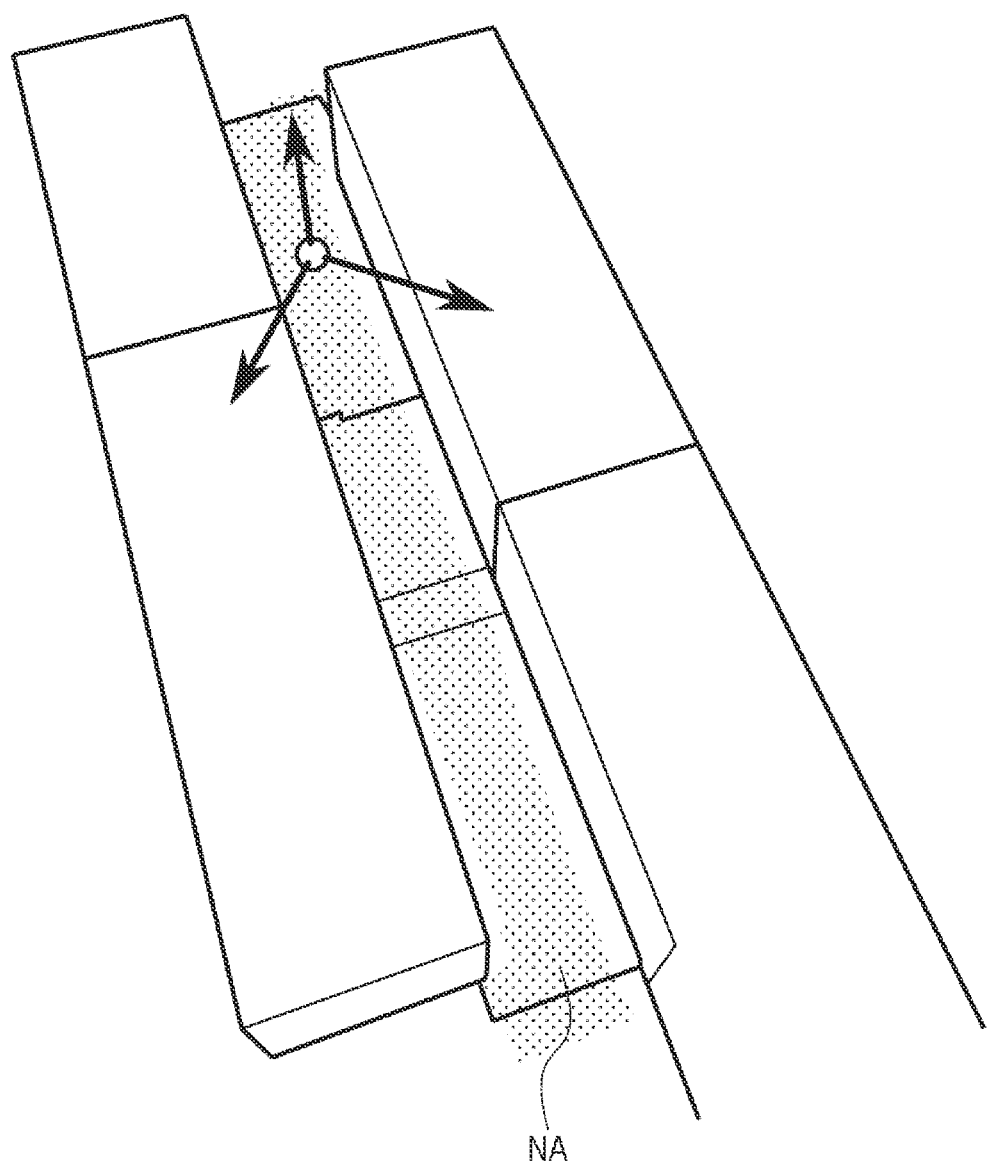
FIG. 2 is a diagram illustrating a setting example of a navigation mesh.

For example, as illustrated in FIG. 2, a movable range of the virtual object is registered in advance as an area NA of the navigation mesh on the basis of the shape information of the environment, and the movement route of the virtual object is dynamically calculated within the range. The navigation mesh is automatically generated basically using a floor surface of the environment shape, but in order to actually realize natural motion in the environment, it is necessary to adjust the navigation mesh according to not only the shape of the environment but also characteristics of a location in the environment.

Also in actual game development, by adding attribute information in advance to an impassable portion or the like in the environment, the shape of the automatically generated navigation mesh is excluded from the range of the navigation mesh, or is corrected by a dedicated rule (passable width or the like) of each game, a developer's manual operation, or the like.

Figure 3:
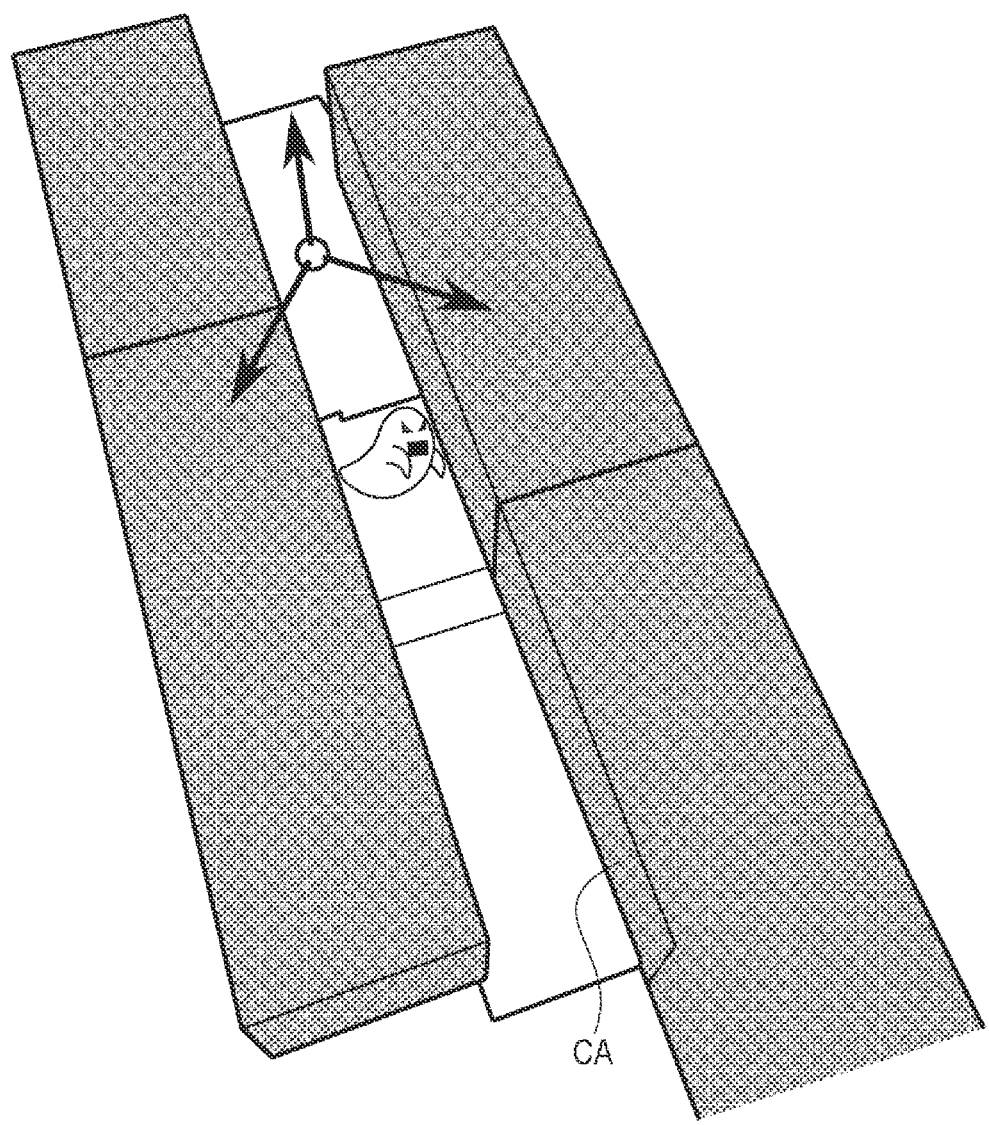
FIG. 3 is a diagram illustrating a setting example of collision.

Similarly, as illustrated in FIG. 3, in order to determine the collision between the environment and the virtual object, a collision area CA using a bounding box according to the mesh shape of the environment is set in the application. The collision is a collision determination object. The virtual object automatically calculates falling into a wall or a floor, passing through, or colliding with a subject in the environment by performing collision determination on the basis of collision of the environment and collision information of the object itself.

This collision is also automatically generated basically on the basis of the shape of the environment mesh. However, similarly to the navigation mesh, adjustment is performed such that the shape is adjusted to realize natural motion, or collision is additionally set to restrict an action to a location where the environment mesh is not present.

In a case where the technology of the game AI is applied in the AR application for the AR HMD, the target environment is the real environment around the user in the AR. Furthermore, in a case where the AR HMD becomes widespread in the future, the user may execute the AR application anywhere, and the user has to dynamically set the navigation mesh and the collision for various real environments.

Furthermore, in the real environment, it is necessary to determine the motion of the character in consideration of not only the shape of the environment but also the way of motion and the height of the viewpoint position of the user as a player, and the movement route and distribution of a third party as a non-player in a case where the AR application is executed in a public place such as a town.

However, at present, a navigation mesh in an unknown environment basically follows the shape information of the environment mesh and static attribute information of a floor, a wall, and the like, and dynamic information such as the motion of a person such as a player or a non-player cannot be considered. Furthermore, Patent Document 1 described above also discloses a technology of adjusting the priority of the content to be displayed from the action history of the player, but does not disclose a technology relating to an action range of the character in the real environment.

Therefore, in the present technology, in the AR application that dynamically determines the arrangement and the way of motion of the virtual object according to the real environment, the arrangement and the movable area of the virtual object are restricted on the basis of information such as the movement route and the visual field range distribution of the user (player or the like) at the time of imaging the environment, and the movement route and the presence distribution of the non-player observed at the time of imaging, so that the virtual object is more appropriately arranged. Hereinafter, the embodiments of the present technology will be described with reference to the drawings.

(Configuration of Apparatus)

Figure 4:
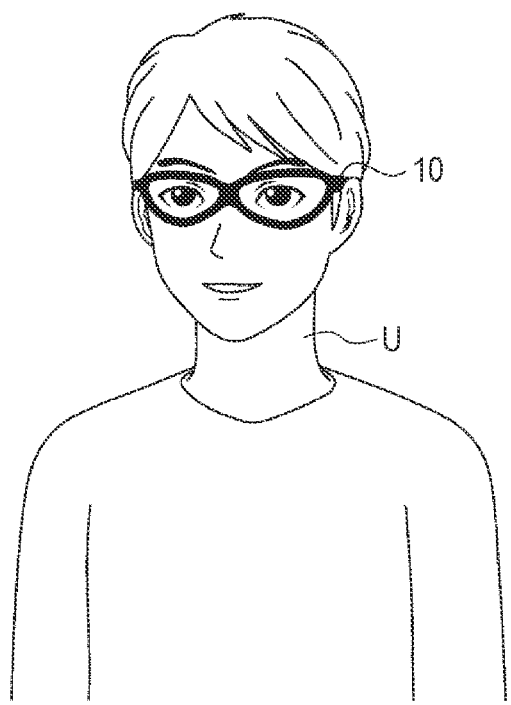
FIG. 4 is a diagram illustrating a configuration example of an appearance of an information processing apparatus to which the present technology is applied.

FIG. 4 illustrates a configuration example of an appearance of an information processing apparatus to which the present technology is applied.

An information processing apparatus 10 is configured as the AR device such as an AR HMD. In FIG. 4, a glasses-type AR HMD (AR glasses) as a mobile terminal is exemplified.

In this AR HMD, a transmissive display is arranged at a position corresponding to a lens attached to a frame in normal glasses. By being worn around the user's eyes, the AR HMD can draw a virtual object in the field of view using the AR technology without separating the user's field of view from the real environment (real space).

The virtual object is an object displayed by the AR device, and includes both a character object and a non-character object.

The information processing apparatus 10 performs processing such as acquisition of surrounding environment information and self-position estimation of the user on the basis of data from a built-in camera or sensor. In the information processing apparatus 10, the AR application is executed on the basis of the processing result, and the virtual object is presented.

In the following description, a case where the information processing apparatus 10 is an AR HMD will be described. However, as long as a device uses a real environment, the present technology is not limited to the optical see-through, and may be a transmission type method such as video see-through. Furthermore, the present technology is not limited to augmented reality (AR), and can be applied to the entire device compatible with xR such as virtual reality (VR) and mixed reality (MR).

Note that the information processing apparatus 10 is not limited to the head-mounted HDM, and may be configured as a handheld mobile terminal such as a smartphone. In a case where the information processing apparatus 10 is configured as a mobile terminal, the position of the terminal may be regarded as the position of the user, and the camera angle of view of the terminal may be regarded as the viewing angle of the user.

Furthermore, as the imaging environment, in addition to using a camera attached to the AR HMD, a camera installed in the environment, a non-handheld terminal such as an unmanned aerial vehicle (drone), or a non-wearable terminal may be used as long as mesh information of the environment and information associated with information regarding a player or a non-player in the environment can be imaged.

Figure 5:
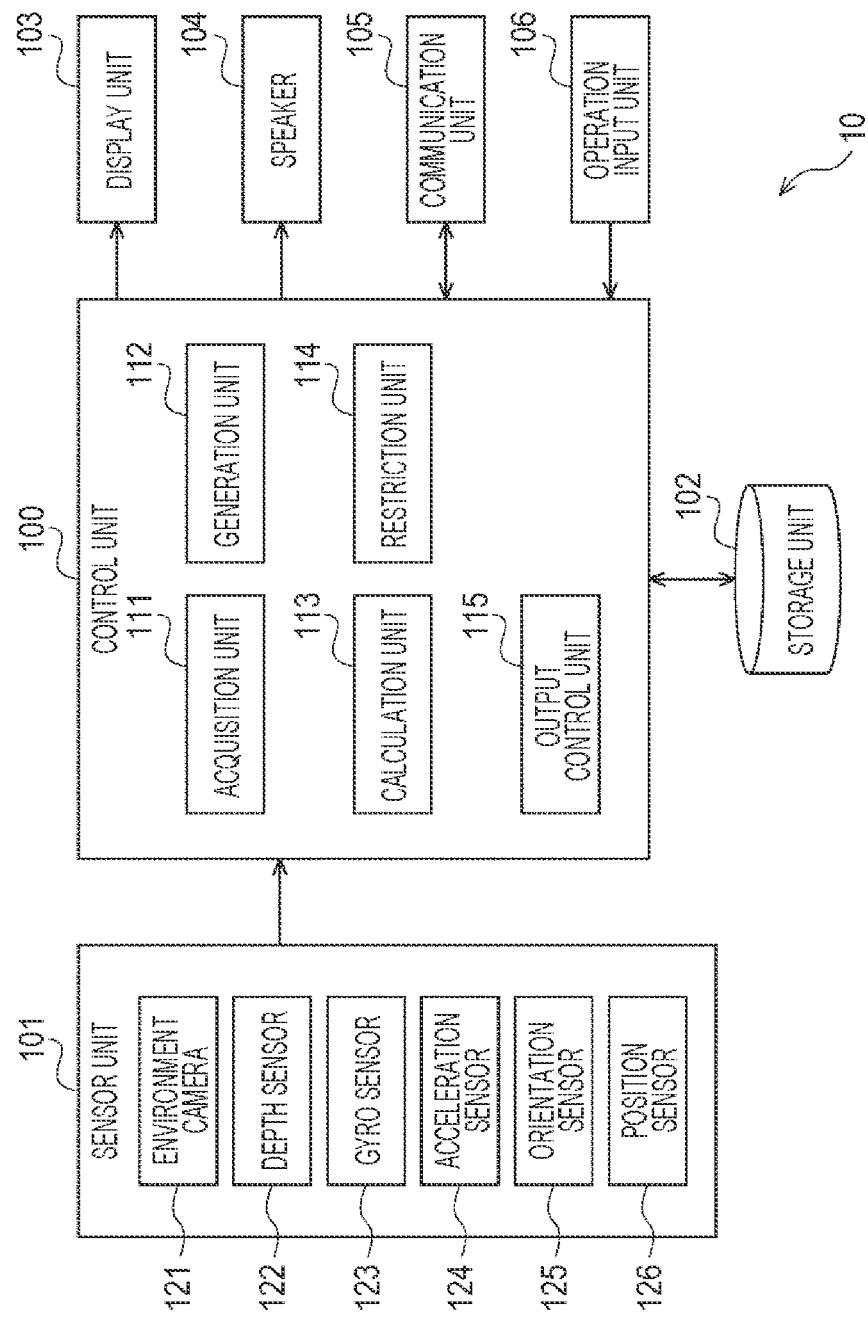
FIG. 5 is a diagram illustrating an internal configuration example of the information processing apparatus to which the present technology is applied.

FIG. 5 illustrates an internal configuration example of the information processing apparatus to which the present technology is applied.

In FIG. 5, the information processing apparatus 10 includes a control unit 100, a sensor unit 101, a storage unit 102, a display unit 103, a speaker 104, a communication unit 105, and an operation input unit 106.

The control unit 100 includes a processor such as a central processing unit (CPU). The control unit 100 is a central control device (processing device) that controls the operation of each unit and performs various types of arithmetic processing, and controls the operation of each unit of the information processing apparatus 10.

The sensor unit 101 includes various sensor devices. The sensor unit 101 performs sensing of the user, the surroundings thereof, and the like, and supplies sensor data obtained as a result of the sensing to the control unit 100. The control unit 100 performs various types of processing on the basis of the sensor data supplied from the sensor unit 101.

The storage unit 102 is an auxiliary storage device including a semiconductor memory such as a nonvolatile memory. The storage unit 102 may be configured as an internal storage, or may be an external storage such as a memory card. The storage unit 102 records various types of data under the control of the control unit 100.

In a case where the information processing apparatus 10 is an AR HMD, the display unit 103 is configured as a transmissive display for the left eye or the right eye. The display unit 103 displays an image according to the display data and various types of information under the control of the control unit 100.

The speaker 104 is configured as a speaker built in the information processing apparatus 10. The speaker 104 outputs a sound corresponding to sound data under the control of the control unit 100. Note that earphones or headphones may be used instead of the built-in speaker, and for example, in a case where the information processing apparatus 10 is an AR HMD, the speaker may be configured as small headphones arranged at positions close to the left and right ears of the user.

The communication unit 105 is configured as a communication device (communication module) compatible with wireless communication or wired communication such as wireless local area network (LAN) or cellular communication (for example, LTE-Advanced, 5G, or the like). The communication unit 105 communicates with other devices via a network under the control of the control unit 100 to exchange various types of data.

The operation input unit 106 includes a physical button, a touch sensor, and the like. The operation input unit 106 supplies operation data according to a predetermined operation by the user to the control unit 100. The control unit 100 performs various types of processing on the basis of the operation data supplied from the operation input unit 106.

The control unit 100 includes an acquisition unit 111, a generation unit 112, a calculation unit 113, a restriction unit 114, and an output control unit 115.

The acquisition unit 111 acquires environment imaging data obtained at the time of environment imaging, and supplies the environment imaging data to the generation unit 112 and the calculation unit 113. The environment imaging data includes sensor data supplied from the sensor unit 101. The environment imaging data may be appropriately recorded in the storage unit 102, and read out as necessary.

The generation unit 112 generates an environment mesh on the basis of the environment imaging data supplied from the acquisition unit 111. The environment mesh is environment map data including data indicating a three-dimensional structure of the real environment (real space).

Furthermore, the generation unit 112 generates the navigation mesh and the collision on the basis of the generated environment mesh. The navigation mesh is an area set in the movable range of the virtual object. The collision is an area set for determining the collision between the real environment and the virtual object.

The data regarding the generated environment mesh, navigation mesh, and collision is supplied to the restriction unit 114.

The calculation unit 113 calculates a physical quantity relating to the dynamic object in the environment on the basis of the environment imaging data supplied from the acquisition unit 111, and supplies the data to the restriction unit 114. The data of the physical quantity relating to the dynamic object may be appropriately recorded in the storage unit 102, and read out as necessary.

The dynamic object is a person object including the user (a player, a non-player, or the like) or a moving object including a moving subject (an automobile, a bicycle, or the like) excluding a person. Examples of the physical quantity relating to the dynamic object include the position of the dynamic object, the movement route of the dynamic object, the moving speed of the dynamic object, the stay time of the dynamic object, and the distribution of the visual field range of the dynamic object.

In other words, since these physical quantities are calculated from the sensor data, it can be said that the physical quantities correspond to the detection result of the sensor unit 101. Furthermore, it can also be said that the dynamic object is an imaging object included in the image captured by the sensor unit 101.

The data regarding the environment mesh, the navigation mesh, and the collision from the generation unit 112, and the data of the physical quantity relating to the dynamic object from the calculation unit 113 are supplied to the restriction unit 114. The restriction unit 114 restricts the size of the environment mesh (the area of the navigation mesh and the collision) on the basis of the physical quantity relating to the dynamic object. The data regarding the restricted environment mesh is supplied to the output control unit 115.

The output control unit 115 performs rendering processing. The output control unit 115 is supplied with the data regarding the virtual object read from the storage unit 102 and the data regarding the restricted environment mesh from the restriction unit 114. The output control unit 115 performs control such that the virtual objects arranged in the restricted environment mesh are displayed on the screen of the display unit 103.

Note that some or all of these functions are realized by the control unit 100 executing the AR application recorded in the storage unit 102.

The sensor unit 101 includes an environment camera 121, a depth sensor 122, a gyro sensor 123, an acceleration sensor 124, an orientation sensor 125, and a position sensor 126.

The environment camera 121 is a camera for imaging a real environment, and includes an image sensor, a signal processing circuit, and the like. The environment camera 121 supplies environment image data obtained by imaging the real environment to the control unit 100.

The depth sensor 122 includes a distance image sensor using a Time-of-Flight (ToF) method or the like. The depth sensor 122 supplies depth data obtained by scanning a three-dimensional subject in the real environment to the control unit 100.

The gyro sensor 123 is a sensor that measures a three-dimensional angular velocity. The acceleration sensor 124 is a sensor that measures acceleration. The three-dimensional angular velocity and the acceleration of the information processing apparatus 10 are measured by the gyro sensor 123 and the acceleration sensor 124, and the measurement data is supplied to the control unit 100.

The orientation sensor 125 includes a three-axis geomagnetic sensor or the like. The direction in which the information processing apparatus 10 is facing is measured by the orientation sensor 125, and the measurement data is supplied to the control unit 100. The position sensor 126 is a sensor that measures the motion and movement of a subject to be measured. The position sensor 126 supplies measurement data obtained by measuring the subject to be measured, to the control unit 100.

Note that the configuration illustrated in FIG. 5 is an example of the configuration of the information processing apparatus 10, and other components may be added or the above-described components may be removed. In particular, other sensors may be used as an example of the configuration of the sensor unit 101 described above. For example, an inertial measurement unit (IMU) of 9 degrees of freedom (DoF) can be used.

In the information processing apparatus 10 configured as described above, in the AR application, at the time of imaging the environment (environment mesh), the movement route and the distribution of the visual field range of the user (player or the like) in the environment, and the presence distribution and the movement route of the third party (non-player or the like) are recorded together with the environment mesh. Then, on the basis of the recorded information, a range in which the user can actually move in the environment and an area of the three-dimensional space having a high possibility of being viewed are estimated. At the same time, on the basis of the recorded information, an area of the three-dimensional space in which a third party is present or likely to move in the environment is estimated.

Subsequently, in the information processing apparatus 10, the navigation mesh automatically generated by the shape of the environment mesh is compared with the estimated movable range of the user, and an area where the user cannot move or is unlikely to move is excluded from the navigation mesh. Moreover, comparison is made with an area of the three-dimensional space in which a third party is present or likely to move, and an area where a location conflict with the third party is likely to occur is excluded from the navigation mesh.

Moreover, in the information processing apparatus 10, the shape of the collision automatically generated by the shape of the environment mesh is compared with the estimated distribution of the three-dimensional visual field range of the user, and the collision is additionally set in an area of the three-dimensional space having a low possibility of being viewed by the user, for example, a vertical upper surface that is likely to be out of the visual field or the like. Similarly, in order to exclude the area of the three-dimensional space in which a third party is present or likely to move, from the movable area of the virtual object, the collision is additionally set in the area.

As described above, in the information processing apparatus 10, the area where the AR application can be used can be dynamically set in consideration of not only the shape of the environment but also a person or a moving subject such as a user (player or the like) or a third party (non-player or the like) in the actual environment.

(Flow of Processing)

Next, a flow of information processing executed by the information processing apparatus 10 will be described with reference to the flowcharts of FIGS. 6 and 7.

Figure 8A:
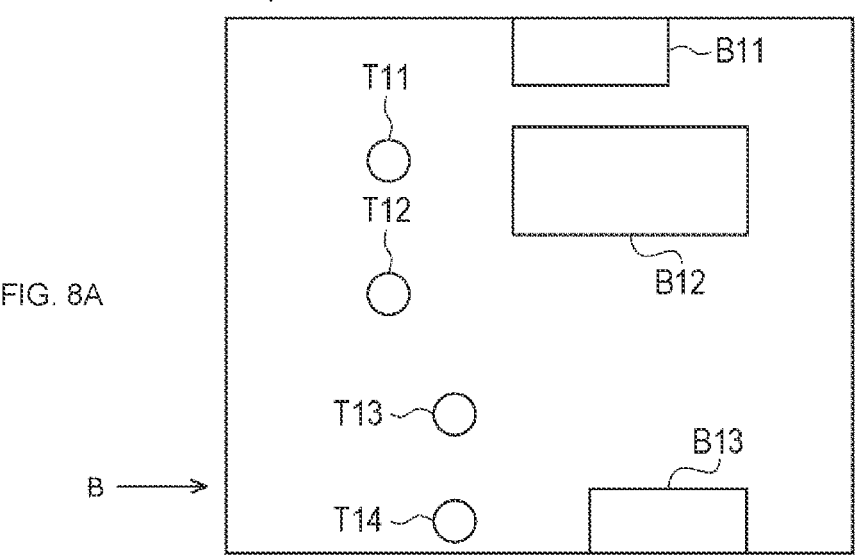
FIGS. 8A and 8B are diagrams illustrating an example of an environment in which the AR application is executed.
Figure 8B:
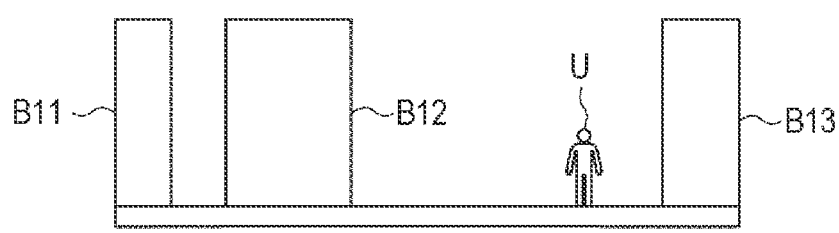

In the following description, it is assumed that the real environment (real space) in a case where the AR application is executed in the information processing apparatus 10 such as an AR HMD worn on the head of a user U is an environment as illustrated in FIGS. 8A and 8B.

That is, FIG. 8A illustrates a conceptual diagram (Top View) of the environment in a bird's eye view, which is viewed from above, and FIG. 8B illustrates a side view of the environment viewed from the left in the bird's eye view of FIG. 8A.

As illustrated in FIGS. 8A and 8B, in this environment, structures such as buildings B11 to B13 and street trees such as trees T11 to T14 are present as real objects. However, in the side view of FIG. 8B, some real objects are omitted for easy understanding of the description. In FIGS. 8A and 8B, the user U is present in a space between the building B12 and the building B13.

In step S11, the output control unit 115 presents the size of the area (use area) used in the AR application to the user U at the time of activation or before activation of the AR application.

For example, in the information processing apparatus 10, since the information associated with information regarding the size of the use area necessary as the AR application to be activated is displayed on the display unit 103, the user U who has checked the display performs imaging of the environment. As the user U who performs imaging of such an environment, an operator of an event or the like may perform the imaging in accordance with a situation of using the AR application, or a player who actually experiences the AR application may perform the imaging before the experience of the main story.

In step S12, the acquisition unit 111 acquires the environment imaging data obtained at the time of environment imaging by the user U.

Figure 9A:
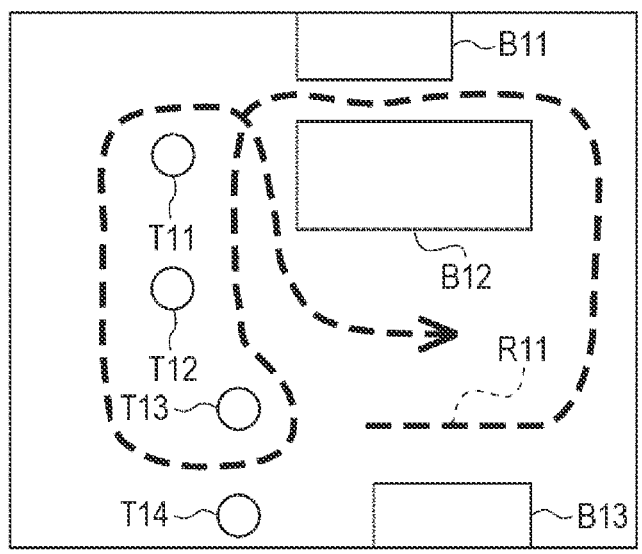
FIGS. 9A and 9B are diagrams illustrating an example of an imaging path of an environment.
Figure 9B:
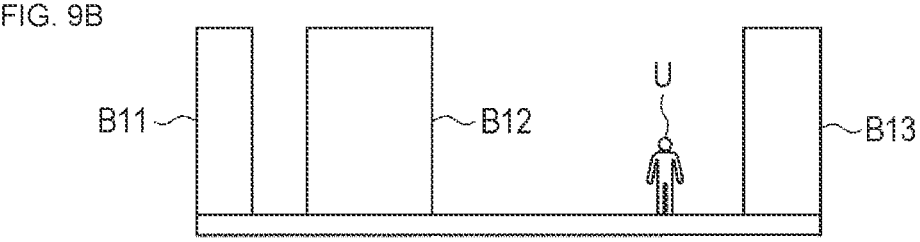

FIGS. 9A and 9B illustrate the movement route in a case where the user U who is an operator or a player walks in the environment and images the real environment, by a route R11 indicated by a broken line in the drawing. With such imaging on the movement route, in the information processing apparatus 10, sensor data obtained as a result of sensing by the sensor unit 101 is acquired as the environment imaging data, and is sequentially recorded in the storage unit 102.

The environment imaging data includes data of an environment image and depth information for generating the environment mesh. In generating the environment mesh, meshing is performed on the basis of an estimation result of the three-dimensional shape using an algorithm such as structure from motion (SfM) from a plurality of environment images (still images) captured by the environment camera 121, the estimation from the environment image, or point cloud information in a depth direction of the environment obtained by the depth sensor 122.

The environment image is used to estimate the position and movement route of the dynamic object in the environment. The storage unit 102 records the position and movement route of a dynamic object (mainly a person such as a third party) other than the player in the environment. The dynamic object is estimated on the basis of the environment image captured by the environment camera 121.

Various techniques can be used to detect the dynamic object, but some representative techniques are listed here. That is, techniques such as detection of a moving subject by differential extraction from a plurality of consecutive images, detection by an estimation algorithm of a human body pose such as OpenPose, and detection by object recognition using dictionary-based image recognition can be used. The type and position of the dynamic object present in the environment, the change thereof, and the like are recorded using these techniques.

The position change of the user U is recorded as time-series data of the head position at the time of imaging. The head position of the user U corresponds to the position and posture of the AR HMD, and the data included in the position and posture is an assumed position change from the imaging start point and a posture change of the AR HMD. These can use a result of simultaneous localization and mapping (SLAM) calculated using consecutive environment images captured by the environment camera 121.

As the SLAM data here, data corrected in combination with position and posture estimation using inertial navigation by the IMU may be used. Furthermore, the position change and the posture change are recorded together with the time stamp of the original environment image, and the moving speed, the stay time, and the like at each location are also recorded as information that can be checked. Furthermore, in a case where a sensor capable of detecting the line-of-sight of the wearer is incorporated in the AR HMD, the line-of-sight data of the user U may be recorded in addition to the above-described position and posture.

In step S13, the generation unit 112 generates the environment mesh on the basis of the acquired environment imaging data.

As described above, the environment mesh is meshed on the basis of the estimation result of the three-dimensional shape using an algorithm such as SfM from a plurality of environment images, the estimation from the environment image, or the point cloud information in the depth direction of the environment.

The entire environment mesh may be recorded as one mesh according to the size of the environment and the using way in the AR application to be used, or may be recorded by being divided into a plurality of environment meshes according to a certain size or characteristics such as a location (for example, for each room). At this time, attributes for each rough location such as a floor and a wall are segmented and simultaneously stored on the basis of the generated environment mesh.

In step S14, the calculation unit 113 calculates the movement route of the user U in the environment, the moving speed of the user U in each area in the environment, and the stay time of the user U in each area in the environment on the basis of the acquired environment imaging data.

As the movement route of the user U in the environment, a value corresponding to the route R11 illustrated in FIGS. 9A and 9B described above are calculated on the basis of the position change of the user U. In a case where imaging is performed a plurality of times at the time of environment imaging, a plurality of movement routes may be calculated and recorded.

Figure 10:
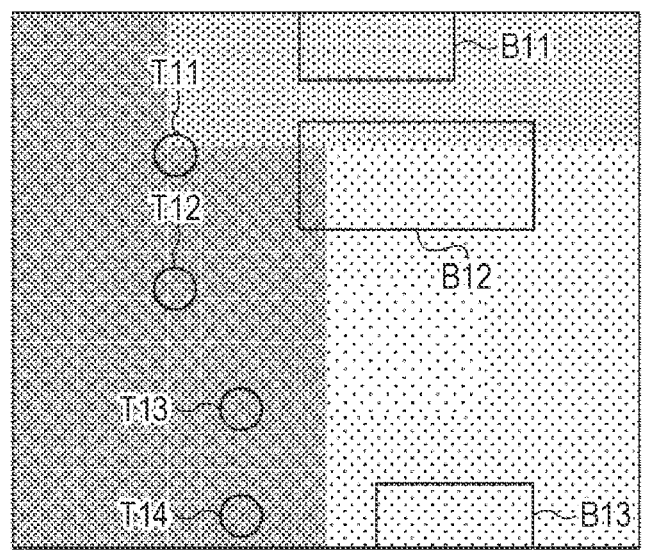
FIG. 10 is a diagram illustrating an example of a moving speed of a user in each area in the environment.

As illustrated in FIG. 10, the moving speed of the user U in each area in the environment is recorded as the moving speed of the user U at the time of environment imaging by dividing the environment into blocks for each certain area and calculating an average value of the moving speeds in each block.

In the example of FIG. 10, the moving speed of the user U is illustrated in a heat map format represented by a dot pattern added in each block, and it is indicated that the moving speed is faster in the area where the density of the dot pattern is higher. Specifically, the area near the trees T11 to T14 is an area having a faster moving speed than other areas. It is only required to record the moving speed as a numerical value in association with each area, as actual data.

Figure 11:
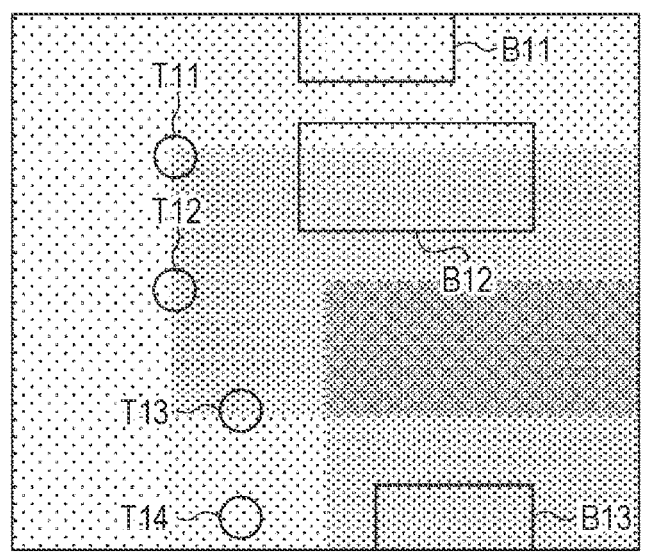
FIG. 11 is a diagram illustrating an example of a stay time of the user in each area in the environment.

As illustrated in FIG. 11, the stay time of the user U in each area in the environment is recorded as the stay time of the user U by dividing the environment into blocks for each certain area and calculating an average value of the stay time in each block.

In the example of FIG. 11, similarly to FIG. 10, the stay time of the user U is illustrated in a heat map format represented by a dot pattern added in each block, and it is indicated that the stay time is longer in the area where the density of the dot pattern is higher. Specifically, the area between the building B12 and the building B13 is an area having a longer stay time than other areas. It is only required to record the stay time as a numerical value in association with each area, as actual data.

Figure 6:
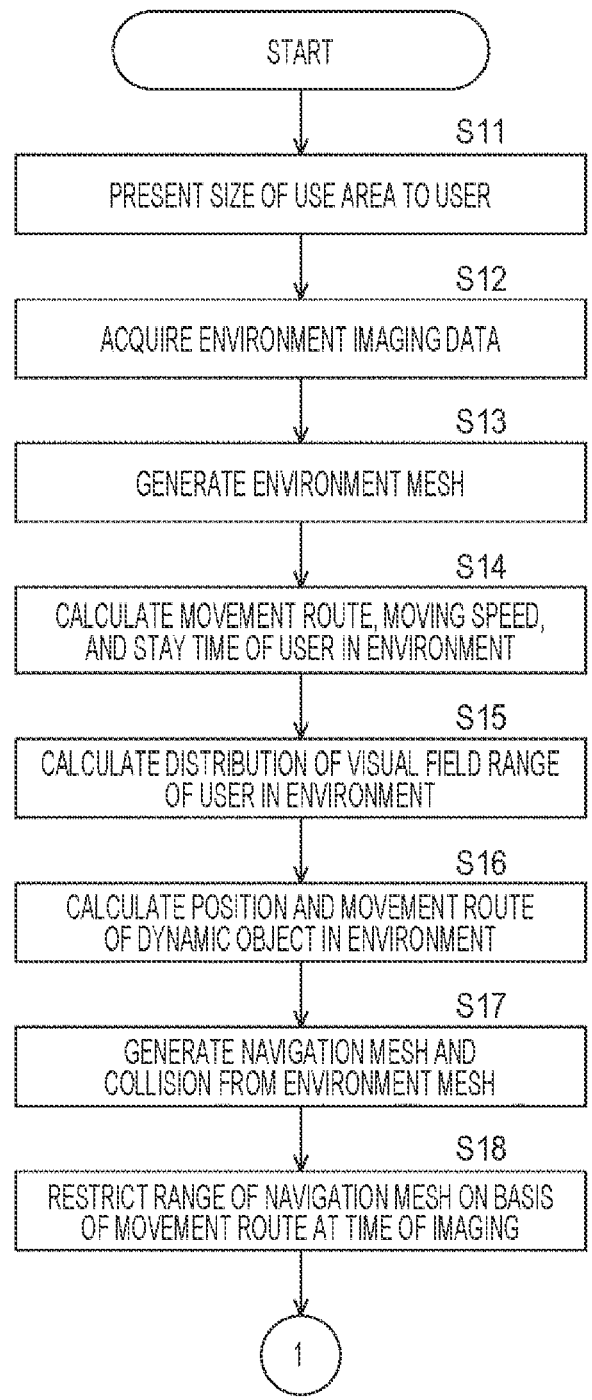
FIG. 6 is a flowchart illustrating a flow of processing to which the present technology is applied.

Returning to the description of FIG. 6, in step S15, the calculation unit 113 calculates the distribution of the visual field range of the user U in the environment on the basis of the acquired environment imaging data.

Here, the visual field range is a range viewed by the user U during the imaging of the environment (a direction in which the head or the line-of-sight is directed). Since the display angle of view at which the content can be displayed is limited due to the characteristics of the device, the AR HMD estimates the range of the visual field that is highly likely to be actually viewed by the user U on the basis of the position change and the head posture change of the user U at the time of environment imaging, and uses the range of the visual field for the adjustment of the available area performed in the step described later.

Figure 12A:
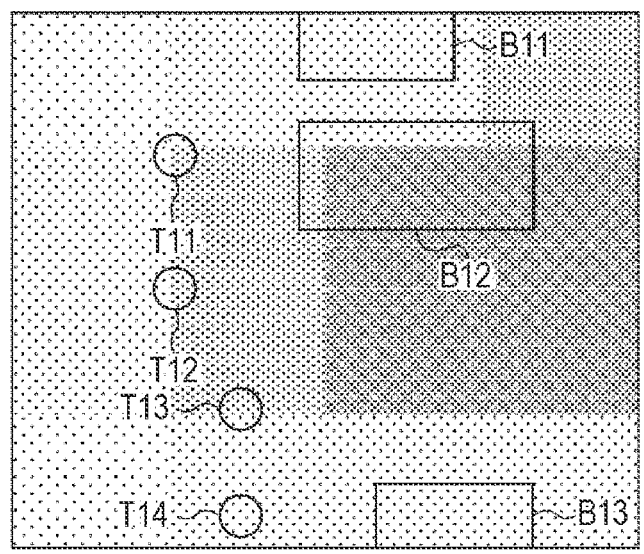
FIGS. 12A and 12B are diagrams illustrating an example of a distribution of a visual field range of the user in the environment.
Figure 12B:
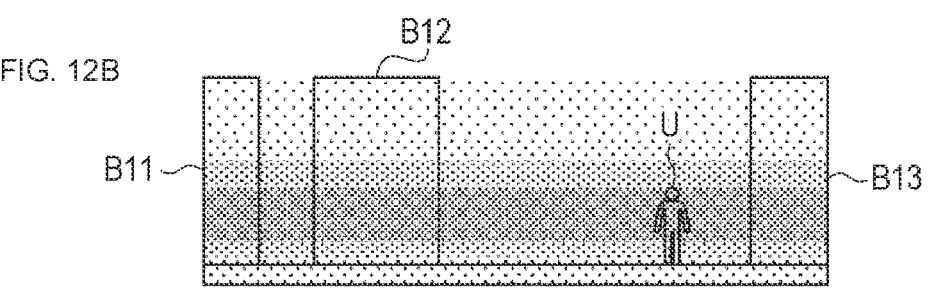

FIGS. 12A and 12B illustrate an examples of the distribution of the visual field range of the user U in the environment. In FIGS. 12A and 12B, similarly to FIGS. 10 and 11, the environment is divided into blocks for each certain area, and each block is provided with a dot pattern having a density corresponding to the length of time for which the environment comes within the visual field of the user U.

FIG. 12A illustrates that the higher the density of the dot pattern, the longer the time for which the environment comes within the visual field. Specifically, the area between the building B12 and the building B13 is an area having a longer time for which the environment comes within the visual field, than other areas.

In FIG. 12B, since there is a difference in distribution in the vertical direction in the visual field range, the blocks are also divided in the vertical direction, and dot patterns having a density corresponding to the distribution of each block are added. Also in FIG. 12B, it is indicated that the higher the density of the dot pattern, the higher the distribution of the visual field range in the vertical direction, and in this example, the closer the block is to the head or upper body of the user U, the higher the distribution of the visual field range. It is only required to record the time for which the environment comes within the visual field for each block as a numerical value, as actual data.

Figure 13A:
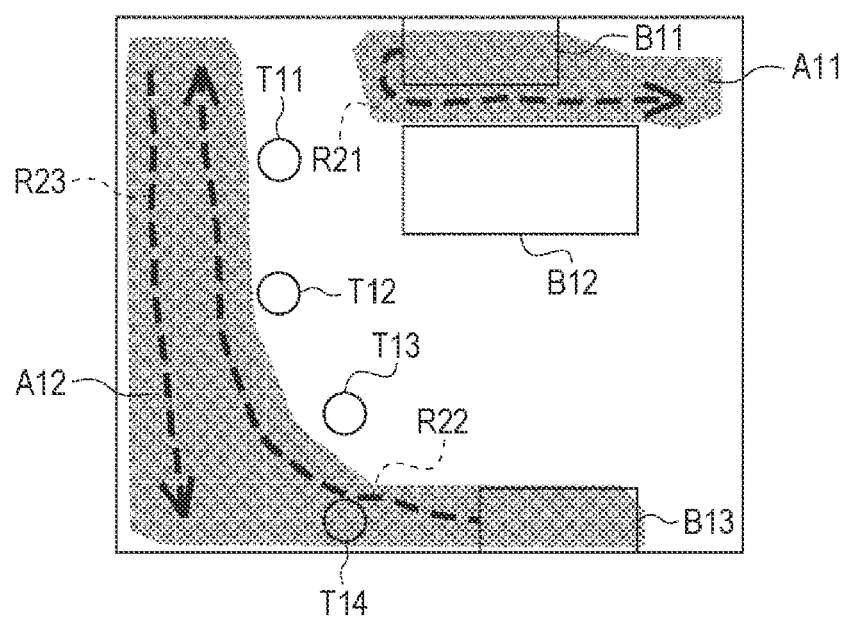
FIGS. 13A and 13B are diagrams illustrating an example of a distribution and movement routes of dynamic objects in the environment.
Figure 13B:
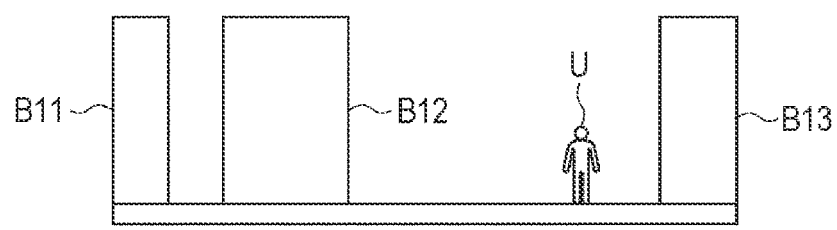

FIGS. 13A and 13B illustrate an examples of the distribution and movement routes of the dynamic objects in the environment. In FIGS. 13A and 13B, hatched areas A11 and A12 are areas having a large distribution of dynamic objects, and routes R21 to R23 indicated by broken lines are movement routes of the dynamic objects. Specifically, an area where there are many people in practice in the environment, such as a passage or near a door, is recorded as an area where there are many dynamic objects.

Note that, in the example of FIGS. 13A and 13B, the area and the route of the dynamic objects are illustrated in a conceptual diagram, but actually, the environment may be divided into blocks of a certain size, and the number of dynamic objects and the stay time of the dynamic object in the blocks may be recorded.

The processing of steps S13 to S16 is divided into steps for each processing for the convenience of description, but these steps may be processed in a different order or in parallel. In a case where the processing of steps S13 to S16 is ended, the processing proceeds to step S17.

In step S17, the generation unit 112 generates the navigation mesh and the collision on the basis of the generated environment mesh.

The navigation mesh is generally generated for a surface manually selected by the developer of the AR application, but here, the navigation mesh is generated for the environment mesh generated by imaging an unknown environment. Therefore, here, the navigation mesh is generated for the surface estimated to be the floor or the ground in the shape of the environment mesh generated in the processing of step S13.

Specifically, in the environment mesh generated in the processing of step S13, a surface that has the largest area among horizontal planes existing downward in the gravity direction and is estimated to be the floor or the ground from the relationship with the head position of the user U is selected, and the navigation mesh is set.

Figure 14A:
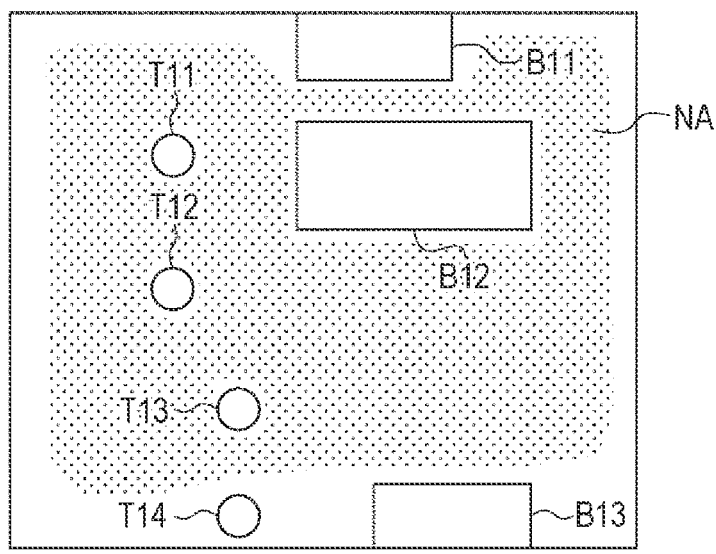
FIGS. 14A and 14B are diagrams illustrating an example of a navigation mesh generated from an environment mesh.
Figure 14B:
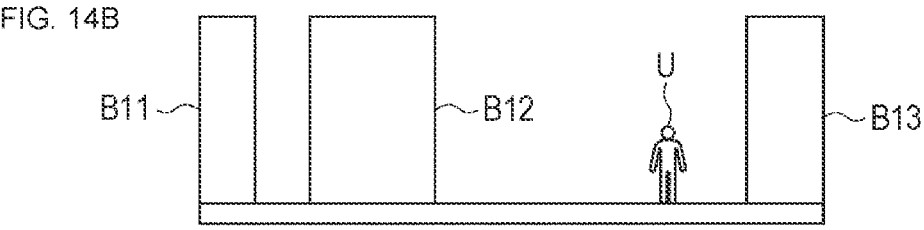

FIGS. 14A and 14B illustrate an examples of the navigation mesh generated from the shape of the environment mesh. In the example of FIGS. 14A and 14B, the hatched area NA is the navigation mesh, and is set as a surface estimated to be the ground in the environment mesh.

The collision is generated on the basis of the shape of the environment mesh. For the collision, the shape is appropriately simplified according to the reduction of the calculation cost of the collision determination and the usage in the AR application, but first, the shape of the environment mesh is used as the collision shape as it is. At this time, the shape may be set by being replaced with a primitive shape such as a box or a capsule according to the capability of the device, the characteristics of the application, or the like.

Figure 15A:
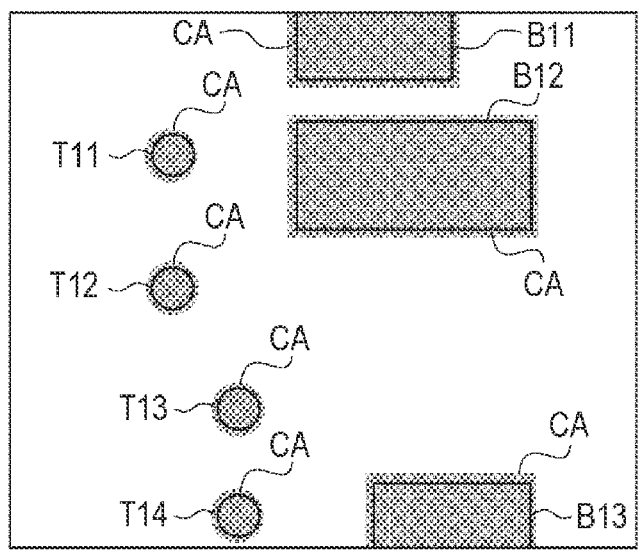
FIGS. 15A and 15B are diagrams illustrating an example of collision generated from the environment mesh.
Figure 15B:
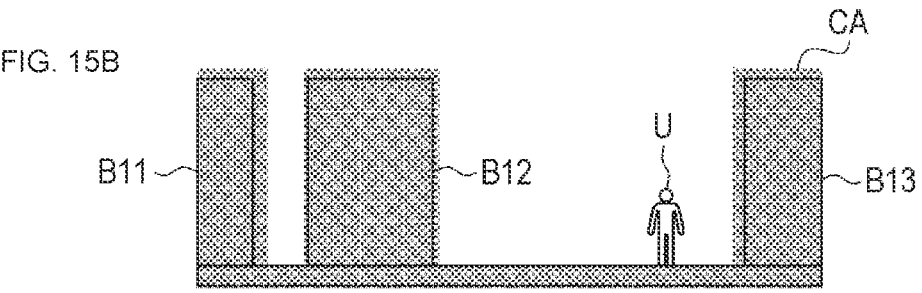

FIGS. 15A and 15B illustrate an examples of the collision generated from the shape of the environment mesh. In the example of FIGS. 15A and 15B, the hatched area CA is the collision, and is set as a bounding box shape matching the shape of the environment mesh.

in a case where the present technology is applied, an example of the arrangement and the movement route of the virtual object in a case where the navigation mesh and the collision generated from the environment mesh are used as they are will be described with reference to FIGS. 16A, 16B, 17A, and 17B.

Figure 16A:
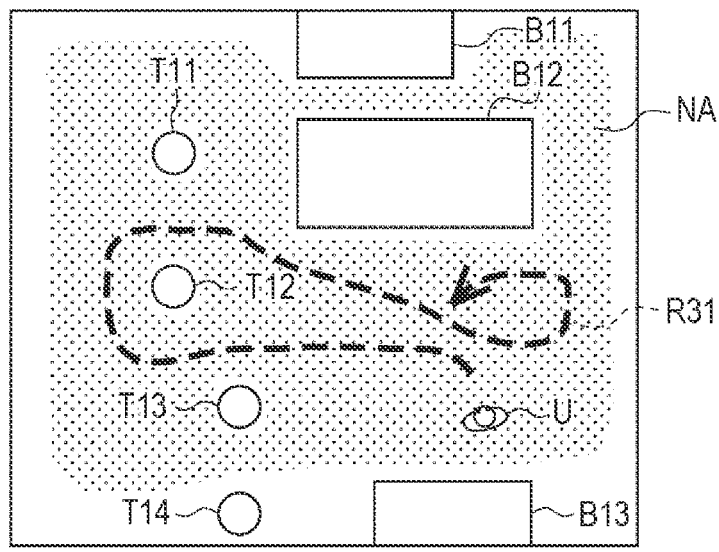
FIGS. 16A and 16B are diagrams illustrating an example of a movement route of a virtual object using a navigation mesh before correction.
Figure 16B:
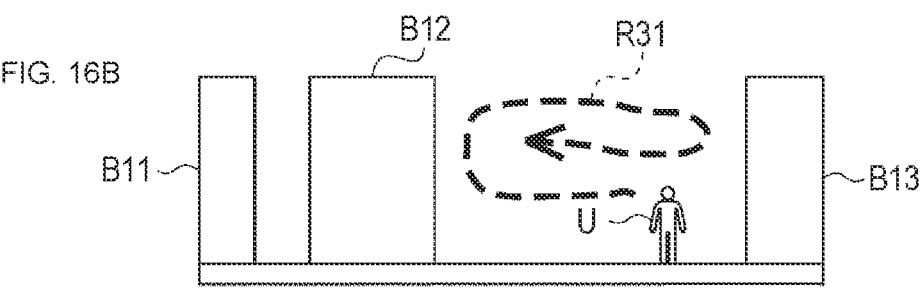

FIGS. 16A and 16B illustrate an examples of the movement route of the virtual object on the navigation mesh before correction, that is, in a case where the navigation mesh generated from the shape of the environment mesh is used as it is. In the example of FIGS. 16A and 16B, since the virtual object can freely move using the entire area NA of the navigation mesh, a route R31 of the virtual object uses the entire floor surface in the environment on the basis of only the shape information of the structure such as the buildings B11 to B13 and the street trees such as the trees T11 to T14.

However, in the actual environment, even for the floor surface, there may be a location that is not suitable for using the AR application, such as an area where there are many people or a locally-dangerous area. Therefore, in the actual environment, it is necessary to further restrict the area where the AR application is used in consideration of the movement route of the third party and the like.

Figure 17A:
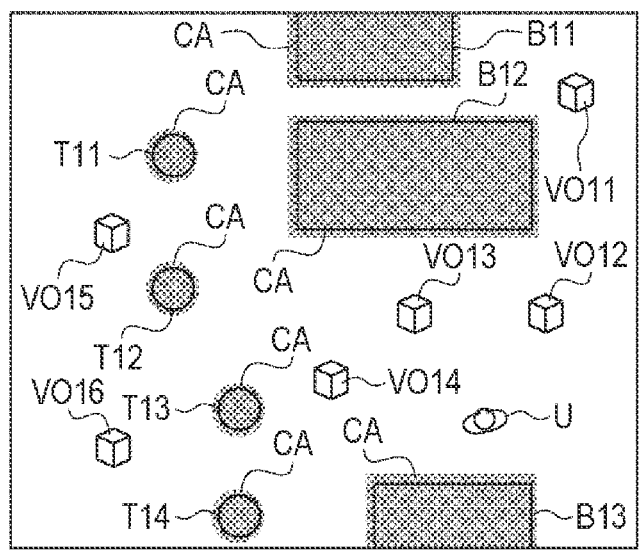
FIGS. 17A and 17B are diagrams illustrating an example of arrangement of virtual objects using collision before correction.
Figure 17B:
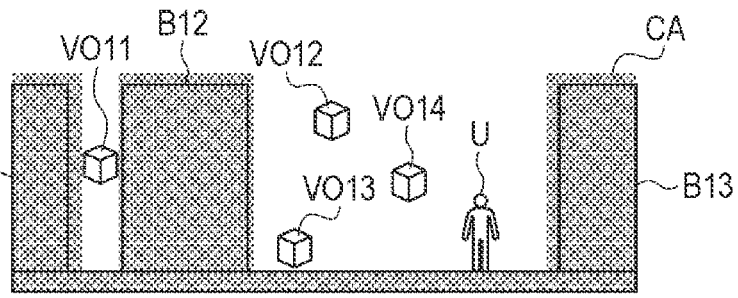

FIGS. 17A and 17B illustrate an examples of the arrangement of the virtual objects based on the collision setting before correction, that is, in a case where the collision generated from the shape of the environment mesh is used as it is. In the example of FIGS. 17A and 17B, virtual objects VO11 to VO16 are arranged by freely using the entire space other than the structure such as the buildings B11 to B13 and the street trees such as the trees T11 to T14 where the collision area CA is set.

Therefore, also in FIGS. 17A and 17B, similarly to the case of using the navigation mesh before correction illustrated in FIGS. 16A and 16B, there is a high possibility that the virtual object is arranged in an area where there are many people in practice or an area that is likely to be overlooked by the user U such as the sky or feet. Such a situation can be avoided by a rule based mechanism determined in advance or the way of making the game AI, but it is difficult to perform versatile rule setting for any unknown environment in advance.

In the present technology, in view of such circumstances, more practical navigation mesh and collision are set with realistic mounting cost and calculation amount on the basis of the information obtained at the time of imaging the environment.

That is, the navigation mesh and the collision generated in the processing of step S17 are corrected by the following processing of steps S18 to S27 on the basis of the information calculated in the processing of steps S14 to S16. Note that the processing of steps S18 to S27 will be described in order for the convenience of description, but the order of the processing may be changed or some of the processing may be omitted.

In step S18, the restriction unit 114 restricts the range of the navigation mesh on the basis of the movement route of the user U calculated in the processing of step S14.

Figure 18A:
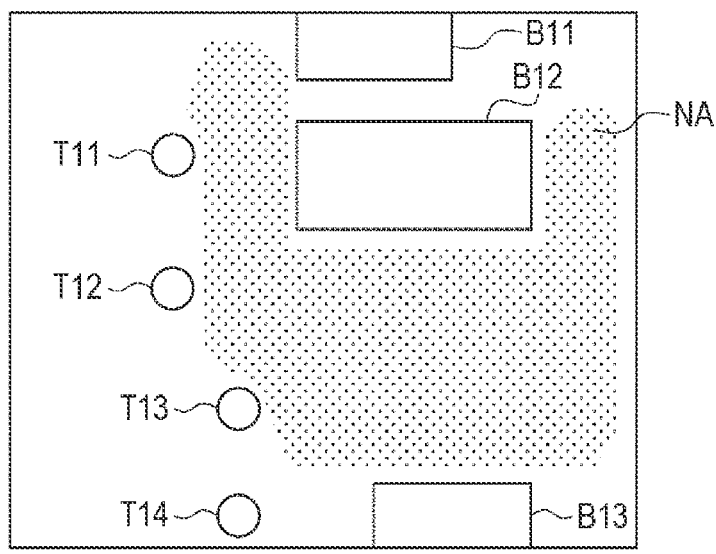
FIGS. 18A and 18B are diagrams illustrating an example of a corrected navigation mesh.
Figure 18B:
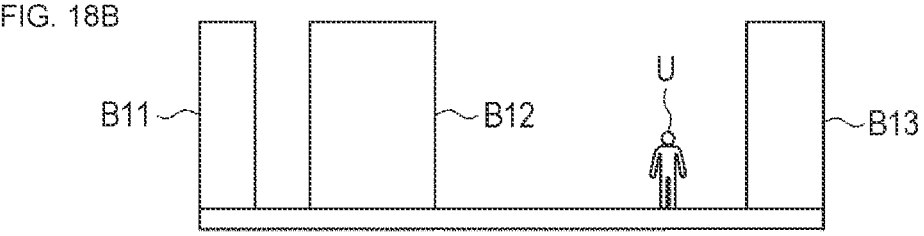

FIGS. 18A and 18B illustrate an examples of the corrected navigation mesh. In the example of FIGS. 18A and 18B, according to the route R11 illustrated in FIGS. 9A and 9B, among the areas in the environment, the area where the possibility that the user U move is low, such as an area where the user U does not walk at the time of imaging or an area where the user U has avoided without walking at the time of imaging, is restricted to be excluded from the area NA of the navigation mesh. Specifically, in FIGS. 18A and 18B, as compared with FIGS. 16A and 16B, areas near the building B11 and the trees T11 to T14 are excluded from the area NA of the navigation mesh.

In step S19, the restriction unit 114 additionally sets the collision area in an area having a small visual field distribution on the basis of the distribution of the visual field range of the user U calculated in the processing of step S15.

Figure 19A:
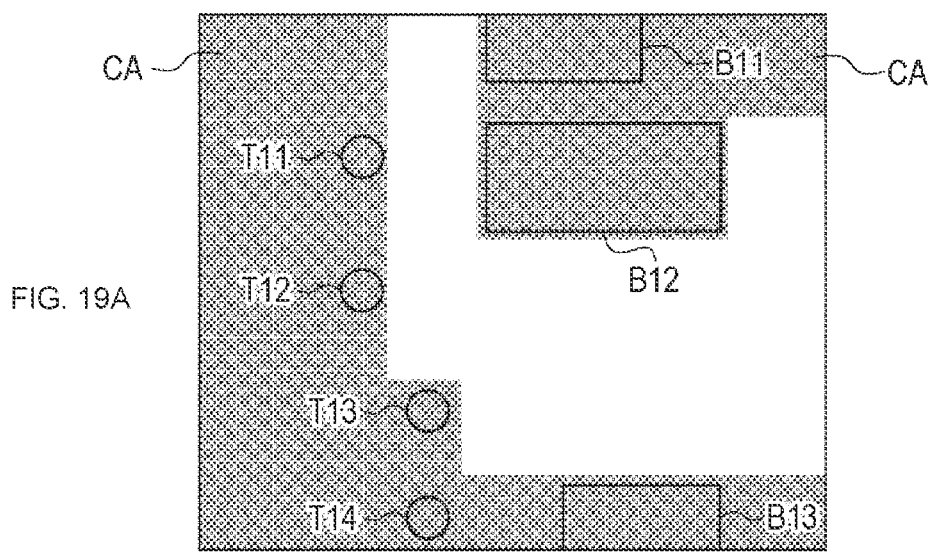
FIGS. 19A and 19B are diagrams illustrating an example of corrected collision.
Figure 19B:
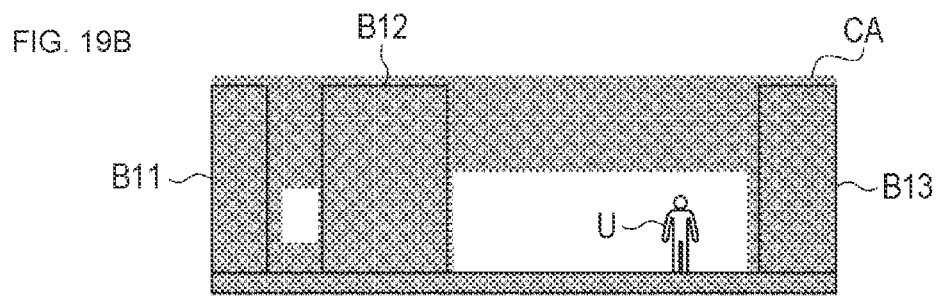

FIGS. 19A and 19B illustrate an examples of corrected collision. In the example of FIGS. 19A and 19B, according to the distribution of the visual field range illustrated in FIGS. 12A and 12B, the collision area CA is additionally set in an area having a small visual field distribution such as a space in the upper portion in the horizontal direction with respect to the user U in each area in the environment. Specifically, in FIG. 19A, as compared with FIG. 15A, the collision area CA is additionally set in the vicinity of the building B11 and the trees T11 to T14. Furthermore, in FIG. 19B, the collision area CA is additionally set in the space in the upper portion of the user U as compared with FIG. 15B. Furthermore, in B of FIG. 19, the collision area CA is additionally set in the space in the upper portion of the user U as compared with B of FIG. 15.

In a case where the processing of step S19 is ended, the processing proceeds to step S20, and the restriction unit 114 performs processing of enlarging or reducing the collision area CA on the basis of the moving speed of the user U calculated in the processing of step S14.

In step S20, it is determined whether or not the moving speed of the user U in each area in the environment is equal to or greater than N1 (km/h). N1 is a threshold used for the determination of the moving speed, and is set by a developer or the like.

In a case where it is determined in the determination processing of step S20 that the moving speed of the user U is equal to or greater than N1 (km/h), the collision areas CA in the upper portion and the lower portion of the user U are enlarged in the vertical direction (S21). On the other hand, in a case where it is determined in the determination processing of step S20 that the moving speed of the user U is less than N1 (km/h), the collision areas CA in the upper portion and the lower portion of the user U are reduced in the vertical direction (S22).

That is, in the area where the moving speed is high, the collision areas CA in the upper portion and the lower portion close to the floor surface corresponding to the outside of the visual field of the user U are enlarged. On the other hand, in the area where the moving speed is slow, since the portion corresponding to the visual field of the user U is widely used, the collision areas CA in the upper and lower portions are reduced. This is because the human visual field range is narrower at the time of moving than at the time of being stationary. Note that both the collision areas CA in the upper and lower portions are not limited to be enlarged or reduced, and at least one of the areas in the upper and lower portions may be enlarged or reduced.

Specifically, it is said that the human visual field range is halved at a speed of 40 km/h as compared with that at rest. In the area where the moving speed is high according to the moving speed in each area in the environment, the available space is restricted so that the virtual object fits within the visual field of the user U as much as possible by setting the collision area CA in the vertical direction to be large.

Note that in a case where it is assumed that the AR is used in a theme park, for example, as a method of using AR using the real environment, it is possible to cope with not only stop and walking of the user but also a vehicle such as a bicycle, movement on an attraction, and the like.

In a case where the processing of step S21 or S22 is ended, the processing proceeds to step S23, and the restriction unit 114 performs processing of enlarging or reducing the collision area CA on the basis of the stay time of the user U calculated in the processing of step S14.

In step S23, it is determined whether the stay time of the user U in each area in the environment is equal to or greater than N2 (s). N2 is a threshold used for the determination of the stay time, and is set by a developer or the like.

In a case where it is determined in the determination processing of step S23 that the stay time of the user U is equal to or greater than N2 (s), the collision areas CA in the upper portion and the lower portion of the user U are reduced in the vertical direction (S24). On the other hand, in a case where it is determined in the determination processing of step S23 that the stay time of the user U is less than N2 (s), the collision areas CA in the upper portion and the lower portion of the user U are enlarged in the vertical direction (S25).

That is, in the area where the stay time is long, the possibility that the user U looks around over a wide area is increased, and thus, the collision areas CA in the upper portion and the lower portion are reduced. On the other hand, in the area where the stay time is short, the possibility that the user U hardly sees the area other than the traveling direction is high, and thus, the collision areas CA in the upper portion and the lower portion close to the floor surface corresponding to the outside of the visual field are enlarged. Note that both the collision areas CA in the upper and lower portions are not limited to be enlarged or reduced, and at least one of the areas in the upper and lower portions may be enlarged or reduced.

In a case where the processing of step S24 or S25 is ended, the processing proceeds to step S26. In step S26, the restriction unit 114 determines whether or not the dynamic object is present in each area in the environment on the basis of the position and the movement route of the dynamic object (third party) calculated in the processing of step S16.

In a case where it is determined in the determination processing of step S26 that the dynamic object is present in each area, the processing proceeds to step S27. In step S27, the restriction unit 114 additionally sets the collision area CA in the route of the dynamic object on the basis of the position and the movement route of the dynamic object calculated in the processing of step S16, and updates the navigation mesh.

That is, the collision area CA is additionally set in the area where the possibility that the dynamic object is present is high or the area where the movement of the dynamic object is estimated to frequently occur, and is excluded from the movable area NA of the navigation mesh.

Specifically, a space corresponding to the presence distribution and the route of the dynamic object illustrated in FIGS. 13A and 13B are added to the collision generated by the environment mesh illustrated in FIGS. 15A and 15B as the collision area CA. As the shape of the collision area CA added here, in a case where the dynamic object is separately managed for each block as described above, the block shape can be added as the shape of the area CA. Alternatively, a bounding box surrounding the entire space in which the presence distribution of the dynamic object is large may be calculated, and the bounding box may be added as the shape of the collision area CA.

Furthermore, regarding the navigation mesh, an area obtained by excluding the area having many dynamic objects illustrated in FIGS. 13A and 13B from the navigation mesh generated from the environment mesh illustrated in FIGS. 14A and 14B are set as the area NA of the corrected navigation mesh. This can be realized simply by comparing the area shapes.

Note that, in a case where it is determined in the determination processing of step S26 that there is no dynamic object in each area, the processing of step S27 is skipped.

As described above, the navigation mesh and the collision generated in the processing of step S17 are corrected by the processing of steps S18 to S27.

That is, the size (range) of the environment mesh in which the virtual object is arranged is restricted by being updated to the corrected navigation mesh and collision in the processing of steps S18 to S27.

In a case where the size of the environment mesh is restricted, for example, the size can be restricted on the basis of the position of the dynamic object (the movement range, the visual field range, or the like of the player or the non-player), the position and the movement route of the imaging object (the non-player or the like), and the area of the real environment (real space) estimated on the basis of the position of the dynamic object (the area augmented to the area where the dynamic object is not detected).

At this time, the environment mesh is generated on the basis of the image captured by the information processing apparatus 10 such as the AR HMD, and the range of the self-position of the information processing apparatus 10 such as the AR HMD is narrower than the range of the environment mesh. Furthermore, the dynamic object includes (a player wearing) the information processing apparatus 10 such as the AR HMD, and in a case where the size of the environment mesh is restricted, the range of the environment mesh not including the self-position of the information processing apparatus 10 such as the AR HMD is excluded.

Figure 20A:
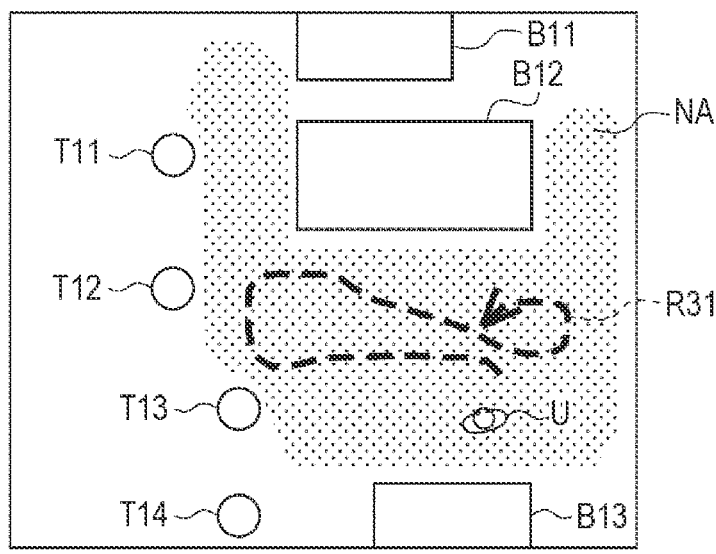
FIGS. 20A and 20B are diagrams illustrating an example of a movement route of a virtual object using a corrected navigation mesh.
Figure 20B:
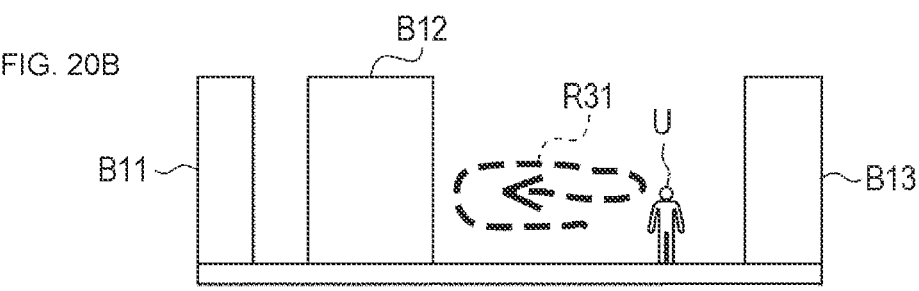

FIGS. 20A and 20B illustrate an examples of the movement route of the virtual object using the corrected navigation mesh. In FIGS. 20A and 20B, the area NA of the navigation mesh is updated to the area excluding, for example, an area where there are many people (third party) as the dynamic object as compared with the area NA of FIGS. 16A and 16B.

Therefore, in FIGS. 20A and 20B, as compared with the route R31 in FIGS. 16A and 16B, the route R31 of the virtual object is updated so as to move on the area NA avoiding the passage of people, and it is possible to suppress problems such as collision with a third party or overlapping of the virtual object and the third party while the user U is executing the AR application.

Figure 21A:
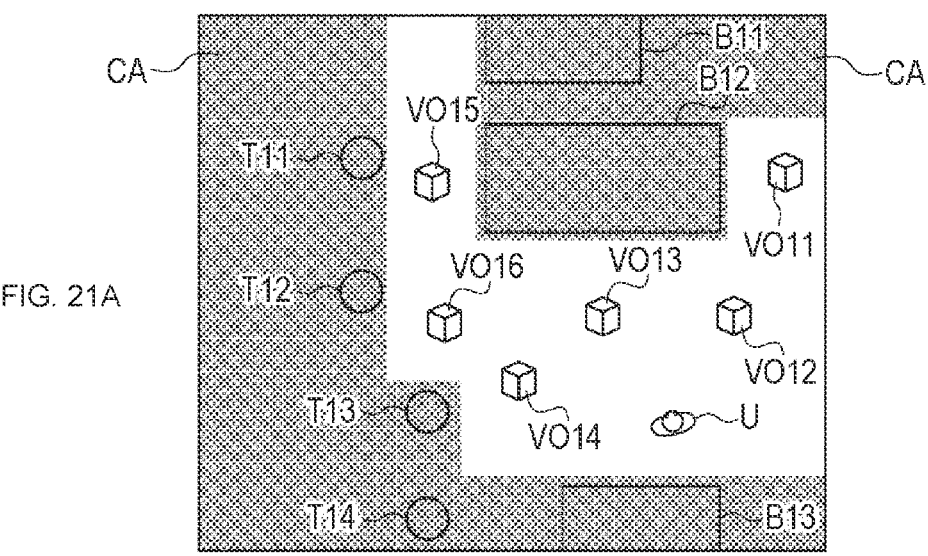
FIGS. 21A and 21B are diagrams illustrating an example of arrangement of virtual objects using corrected collision.
Figure 21B:
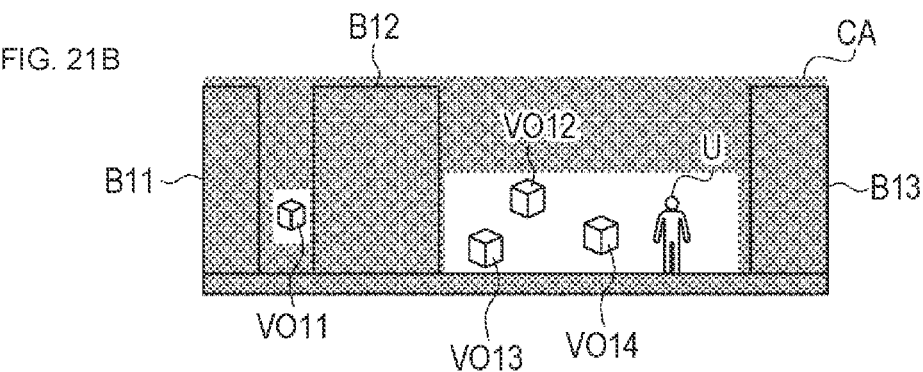

FIGS. 21A and 21B illustrate an examples of arrangement of the virtual objects using the corrected collision. In FIG. 21A, similarly to the navigation mesh illustrated in FIG. 20A, an area where there are many people (third parties) as dynamic objects or the like is excluded from the areas of the arrangement candidates of the virtual objects VO11 to VO16, and become the collision area CA. In FIG. 21B, an area where the visual field range of the user U is taken into consideration is excluded from the areas of the arrangement candidates of the virtual objects VO11 to VO16.

Therefore, as compared with FIG. 17A, in FIG. 21A, the positions of the virtual objects VO12 to VO14 arranged in the area between the building B12 and the building B13 are not changed, but the positions of the virtual objects VO11, VO15, and VO16 arranged in the area near the building B11 or the trees T11 to T14 are moved to an area other than the location where the collision area CA is set. In FIG. 21B, the virtual objects VO11 to VO14 are arranged at a height in consideration of the visual field range of the user U as compared with FIG. 17B.

Actually, it is assumed that the user U plays the AR application in various environments using the information processing apparatus 10 such as the AR HMD, and it is difficult to dynamically grasp all the environments and completely control the behavior of the game AI. On the other hand, by using the present technology, it is possible to dynamically set an optimal usable area in accordance with the motion of a person such as the user U or a third party in the environment without requiring a calculation cost or a development cost on the basis of the motion of the user U at the time of imaging the environment. As a result, it is possible to more optimally arrange virtual objects for various real environments.

2. Modification Example (System Configuration)

Figure 22:
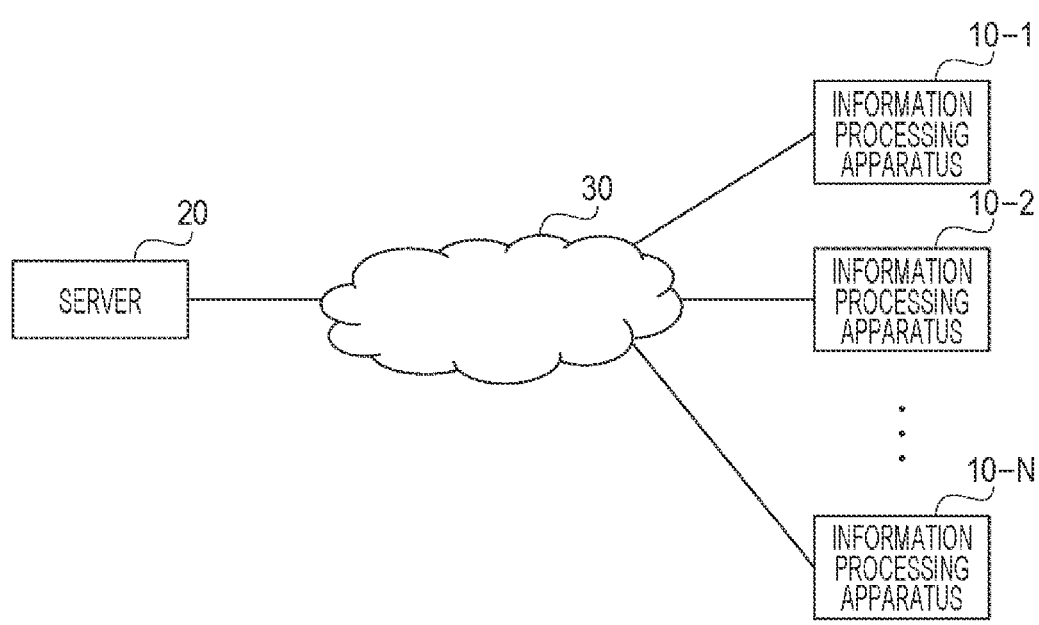
FIG. 22 is a diagram illustrating a configuration example of an information processing system to which the present technology is applied.

FIG. 22 illustrates a configuration example of the information processing system to which the present technology is applied.

The information processing system includes information processing apparatuses 10-1 to 10-N (N: an integer of 1 or more), and a server 20. In the information processing system, the information processing apparatuses 10-1 to 10-N and the server 20 are connected to each other via a network 30. The network 30 includes a communication network such as the Internet, an intranet, or a mobile phone network.

The information processing apparatus 10-1 is a mobile terminal having a display such as an HMD such as an AR HMD, a smartphone, or a wearable device. By executing the AR application, the information processing apparatus 10-1 can present the virtual object in the field of view without separating the field of view of the user from the real environment.

The information processing apparatus 10-1 includes at least the control unit 100, the sensor unit 101, the display unit 103, the speaker 104, the communication unit 105, and the operation input unit 106 in the configuration illustrated in FIG. 5. However, in the information processing apparatus 10-1, the control unit 100 is different from the configuration illustrated in FIG. 5 in including only the acquisition unit 111 and the output control unit 115.

The information processing apparatuses 10-2 to 10-N are configured the mobile terminal such as the AR HMD similarly to the information processing apparatus 10-1. Each of the information processing apparatuses 10-2 to 10-N can execute the AR application to present the virtual object in the field of view for each user without separating the field of view from the real environment.

The server 20 includes one or a plurality of servers, and is installed in a data center or the like. The server 20 includes at least the control unit 100, the storage unit 102, and the communication unit 105 in the configuration illustrated in FIG. 5. However, in the server 20, the control unit 100 includes the generation unit 112, the calculation unit 113, and the restriction unit 114.

The information processing apparatus 10-1 transmits a processing request including the environment imaging data to the server 20 via the network 30. The environment imaging data includes sensor data from the sensor unit 101.

The server 20 receives the processing request transmitted from the information processing apparatus 10-1 via the network 30. The server 20 generates the environment mesh and the like on the basis of the environment imaging data, and calculates a physical quantity relating to the dynamic object. The server 20 restricts the size of the environment mesh on the basis of the physical quantities relating to the dynamic objects. The server 20 transmits a processing response including the data regarding the restricted environment mesh and data regarding the virtual object to the information processing apparatus 10-1 via the network.

The information processing apparatus 10-1 receives the processing response transmitted from the server 20 via the network 30. The information processing apparatus 10-1 performs control such that the virtual objects arranged in the restricted environment mesh are displayed on the screen of the display unit 103.

Note that the processing executed by the information processing apparatus 10-1 has been described as a representative, but the processing executed by the information processing apparatuses 10-2 to 10-N is similar, and thus the description thereof will be repetitive so as to be omitted. Furthermore, the environment imaging data may be appropriately recorded in the storage unit 102 of the server 20, and may be read out as necessary.

Furthermore, in the above description, the configuration has been exemplified in which the control unit 100 of the information processing apparatuses 10-1 to 10-N includes the acquisition unit 111 and the output control unit 115, and the control unit 100 of the server 20 includes the generation unit 112, the calculation unit 113, and the restriction unit 114, but the configuration is an example. For example, some of the generation unit 112, the calculation unit 113, and the restriction unit 114 may be provided on the control unit 100 side of the information processing apparatus 10.

Note that, in the above description, a case has been exemplified in which the AR application is executed by the information processing apparatus 10 configured as the AR HMD, but the present technology is not limited to the AR application, and may be applied to other content such as a game. Furthermore, in the above description, a case has been exemplified in which the environment mesh is generated on the basis of the environment imaging data obtained at the time of activation or before activation of the AR application, but an environment mesh prepared in advance may be used. In this case, it is only required to record the data of the environment mesh in the storage unit 102 of the information processing apparatus 10 or the server 20, and read the data of the environment mesh as appropriate.

<3. Configuration of Computer>

The above-described series of processing (processing illustrated in FIGS. 6 and 7) can be executed by hardware or software. In a case where the series of processing is executed by software, a program constituting the software is installed in a computer of each device.

Figure 23:
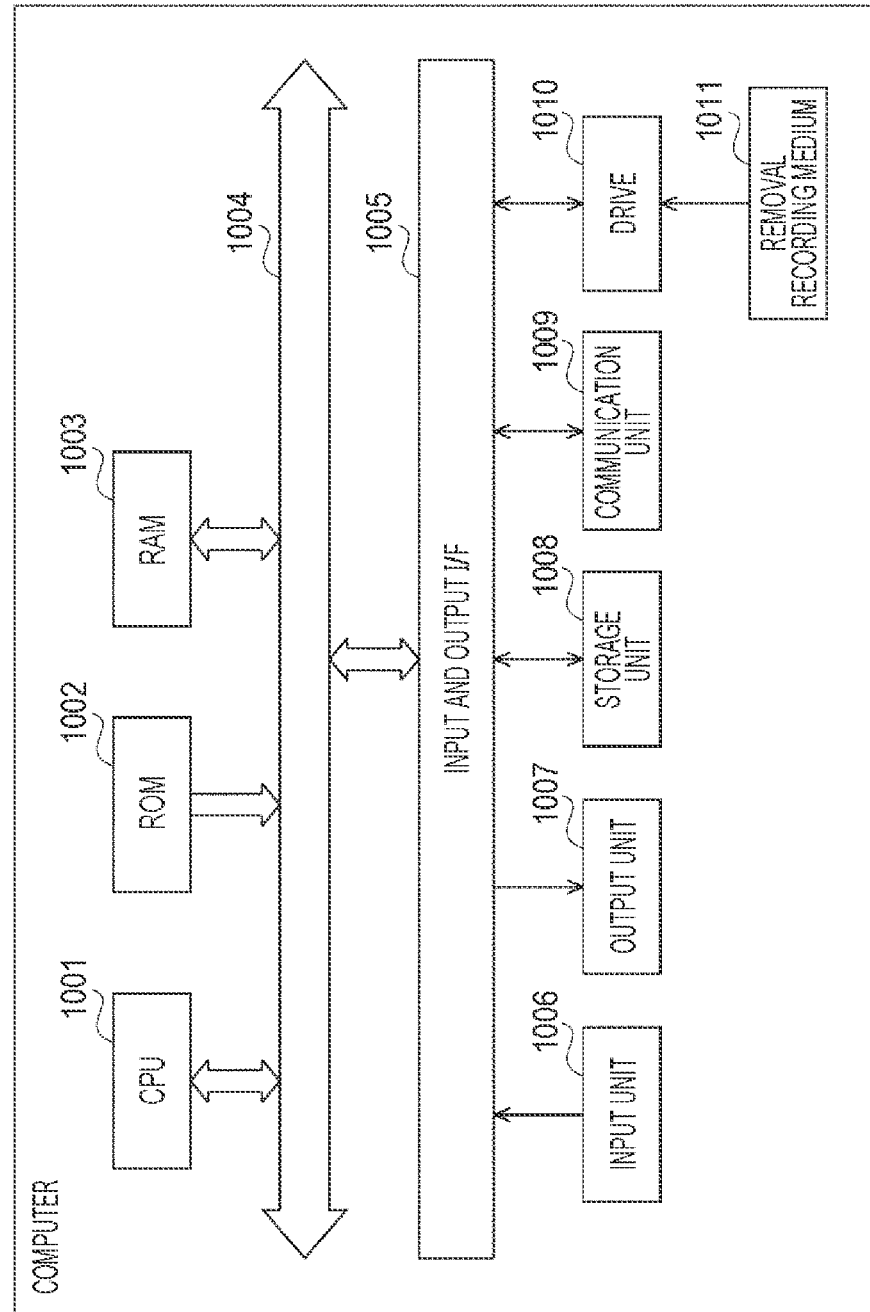
FIG. 23 is a diagram illustrating a configuration example of hardware of a computer.

FIG. 23 is a block diagram illustrating a configuration example of hardware of a computer that executes the above-described series of processing by a program.

In the computer, a central processing unit (CPU) 1001, a read only memory (ROM) 1002, and a random access memory (RAM) 1003 are mutually connected by a bus 1004. Moreover, an input and output interface 1005 is connected to the bus 1004. An input unit 1006, an output unit 1007, a recording unit 1008, a communication unit 1009, and a drive 1010 are connected to the input and output interface 1005.

The input unit 1006 includes a microphone, a keyboard, a mouse, and the like. The output unit 1007 includes a speaker, a display, and the like. The recording unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer configured as described above, the CPU 1001 loads a program recorded in the ROM 1002 or the recording unit 1008 into the RAM 1003 via the input and output interface 1005 and the bus 1004 and executes the program, and thereby the above-described series of processing is performed.

The program executed by the computer (CPU 1001) can be provided by being recorded in the removable recording medium 1011 as a package medium or the like, for example. Furthermore, the program can be provided via a wired or wireless transmission medium such as a local area network, the Internet, or digital satellite broadcasting.

In the computer, the program can be installed in the recording unit 1008 via the input and output interface 1005 by mounting the removable recording medium 1011 to the drive 1010. Furthermore, the program can be installed in the recording unit 1008 by being received by the communication unit 1009 via a wired or wireless transmission medium. In addition, the program can be installed in the ROM 1002 or the recording unit 1008 in advance.

Here, in the present specification, the processing performed by the computer according to the program is not necessarily performed in time series in the order described as the flowchart. That is, the processing performed by the computer according to the program also includes processing executed in parallel or individually (for example, parallel processing or processing depending on objects). Furthermore, the program may be processed by one computer (processor) or may be processed in a distributed manner by a plurality of computers.

Figure 7:
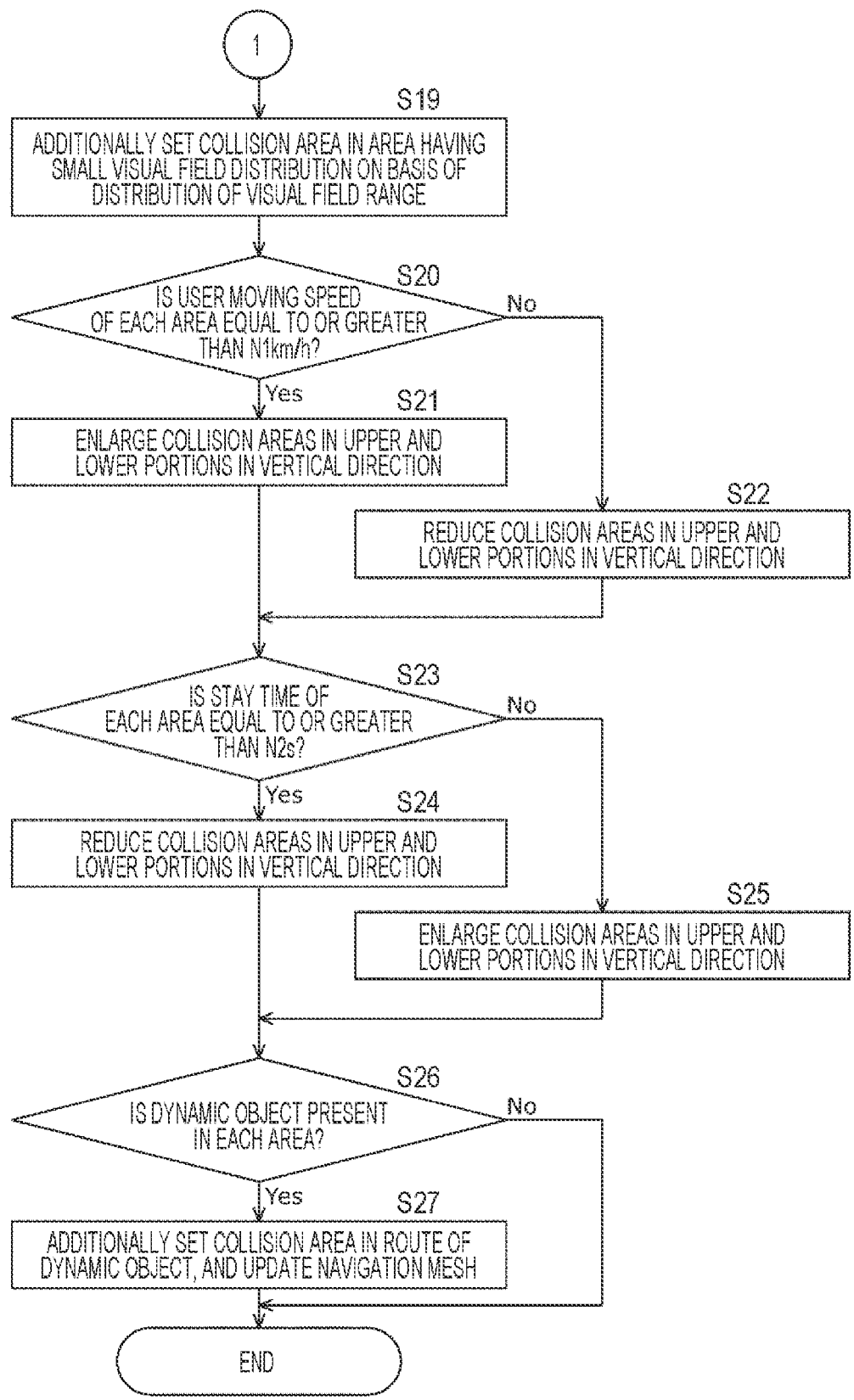
FIG. 7 is a flowchart illustrating a flow of processing to which the present technology is applied.

Furthermore, each step of the processing illustrated in FIGS. 6 and 7 can be executed by one device or can be shared and executed by a plurality of devices. Moreover, in a case where a plurality of types of processing is included in one step, the plurality of types of processing included in the one step can be executed by one device or can be shared and executed by a plurality of devices.

Note that the embodiments of the present technology are not limited to the above-described embodiments, and various modifications can be made without departing from the gist of the present technology.

Furthermore, the effects described in the specification are merely examples and are not limited, and may have other effects.

Note that the present technology can also have the following configurations.

(1)

An information processing apparatus including:
a control unit that restricts a size of an environment map data in which a virtual object is arranged, on the basis of a detection result by a sensor of a real space associated with the environment map data.

(2)

The information processing apparatus described in (1), in which the detection result includes a position of a dynamic object detected by the sensor, and
the control unit restricts a range of the environment map data on the basis of the position of the dynamic object.

(3)
The information processing apparatus described in (2),
in which the dynamic object includes a mobile terminal provided with the sensor, and
the control unit excludes the range of the environment map data which does not include a self-position of the mobile terminal.

(4)
The information processing apparatus described in (3),
in which the environment map data is generated on the basis of an image captured by the mobile terminal, and
a range of the self-position of the mobile terminal detected by the sensor is narrower than the range of the environment map data.

(5)
The information processing apparatus described in any one of (2) to (4),
in which the control unit restricts the range of the environment map data on the basis of an area in the real space estimated on the basis of the position of the dynamic object.

(6)
The information processing apparatus described in (5),
in which the dynamic object is an imaging object included in an image captured by a mobile terminal provided with the sensor, and
the control unit excludes a position of the imaging object and a movement route of the imaging object from the range of the environment map data.

(7)
The information processing apparatus described in any one of (2) to (6),
in which the environment map data is data indicating a three-dimensional structure,
the dynamic object is a person object, and
the control unit restricts the range of the environment map data in a vertical direction on the basis of a visual field range at a position of the person object.

(8)
The information processing apparatus described in any one of (2) to (7),
in which the dynamic object is a person object, and
the control unit restricts the range of the environment map data on the basis of a movement route according to a position of the person object.

(9)
The information processing apparatus described in any one of (2) to (8),
in which the dynamic object is a moving object that includes a person object including a player or a non-player, or a moving subject excluding a person.

(10)
The information processing apparatus described in (7),
in which the detection result includes a moving speed of the person object detected by the sensor, and
the control unit restricts the range of the environment map data on the basis of the moving speed of the person object.

(11)
The information processing apparatus described in (10),
in which the control unit determines whether or not the moving speed is equal to or greater than a first threshold, and
in a case where it is determined that the moving speed is equal to or greater than the first threshold, the control unit restricts the range of the environment map data in the vertical direction at the position of the person object.

(12)
The information processing apparatus described in (7) or (10),
in which the detection result includes a stay time of the person object detected by the sensor, and
the control unit restricts the range of the environment map data on the basis of the stay time of the person object.

(13)
The information processing apparatus described in (12),
in which the control unit determines whether or not the stay time is less than a second threshold, and
in a case where it is determined that the stay time is less than the second threshold, the control unit restricts the range of the environment map data in the vertical direction at the position of the person object.

(14)
The information processing apparatus described in any one of (1) to (13),
in which the detection result is obtained at a time of activation or before activation of an application.

(15)
The information processing apparatus described in (14),
in which the application is an AR application, and
the control unit performs control such that the virtual object arranged in the environment map data is displayed on a transmissive display.

(16)
The information processing apparatus described in (14) or (15), further including:
a storage unit that records the detection result.

(17)
The information processing apparatus described in any one of (1) to (16),
in which the information processing apparatus is configured as a mobile terminal provided with the sensor.

(18)
The information processing apparatus described in (17),
in which the mobile terminal is a head mounted display capable of executing an AR application.

(19)
An information processing method including:
restricting a size of an environment map data in which a virtual object is arranged, on the basis of a detection result by a sensor of a real space associated with the environment map data
by an information processing apparatus.

(20)
A recording medium in which a program is recorded, the program causing a computer to function as:
a control unit that restricts a size of an environment map data in which a virtual object is arranged, on the basis of a detection result by a sensor of a real space associated with the environment map data.

REFERENCE SIGNS LIST

10, 10-1 to 10-N Information processing apparatus
20 Server
30 Network
100 Control unit
101 Sensor unit
102 Storage unit
103 Display unit
104 Speaker 105 Communication unit
106 Operation input unit
111 Acquisition unit
112 Generation unit
113 Calculation unit
114 Restriction unit
115 Output control unit
121 Environment camera
122 Depth camera
123 Gyro sensor
124 Acceleration sensor
125 Orientation sensor
126 Position sensor
1001 CPU

The invention claimed is:

1. An information processing apparatus, comprising:
circuitry configured to:
    restrict a size of an environment map data in which a virtual object is arranged, based on a detection result by a sensor of a real space associated with the environment map data, wherein
        the detection result includes a position of a person object detected by the sensor and a stay time of the person object detected by the sensor, and
        the environment map data is data indicating a three-dimensional structure; and
    restrict a range of the environment map data, based on the position of the person object and the stay time of the person object, wherein
        the range of the environment map data is restricted in a vertical direction based on a visual field range at the position of the person object.

2. The information processing apparatus according to claim 1,
wherein the person object includes a mobile terminal with the sensor, and
the circuitry further configured to exclude the range of the environment map data which does not include a position of the mobile terminal.

3. The information processing apparatus according to claim 2,
wherein the environment map data is generated based on an image captured by the mobile terminal, and
a range of the position of the mobile terminal detected by the sensor is narrower than the range of the environment map data.

4. The information processing apparatus according to claim 1, wherein
the circuitry is further configured to restrict the range of the environment map data based on an area in the real space, and
the area in the real space is based on the position of the person object.

5. The information processing apparatus according to claim 4,
wherein the person object is an imaging object included in an image captured by a mobile terminal with the sensor, and
the circuitry configured to exclude a position of the imaging object and a movement route of the imaging object from the range of the environment map data.

6. The information processing apparatus according to claim 1, wherein
the circuitry further configured to restrict the range of the environment map data, based on a movement route according to the position of the person object.

7. The information processing apparatus according to claim 1,
wherein the person object includes a player, a non-player, or a moving subject excluding a person.

8. The information processing apparatus according to claim 1, wherein
the detection result includes a moving speed of the person object detected by the sensor, and
the circuitry further configured to restrict the range of the environment map data based on the moving speed of the person object.

9. The information processing apparatus according to claim 8, wherein
the circuitry is further configured to determine whether the moving speed is equal to or greater than a first threshold, and
in a case where it is determined that the moving speed is equal to or greater than the first threshold, the circuitry further configured to restrict the range of the environment map data in the vertical direction at the position of the person object.

10. The information processing apparatus according to claim 1,
wherein the circuitry is further configured to determine whether the stay time is less than a second threshold, and
in a case where it is determined that the stay time is less than the second threshold, the circuitry further configured to restrict the range of the environment map data in the vertical direction at the position of the person object.

11. The information processing apparatus according to claim 1,
wherein the detection result is obtained at a time of activation or before activation of an application.

12. The information processing apparatus according to claim 11,
wherein the application is an AR application, and
the circuitry further configured to perform control such that the virtual object arranged in the environment map data is displayed on a transmissive display.

13. The information processing apparatus according to claim 11, further comprising:
a storage unit further configured to record the detection result.

14. The information processing apparatus according to claim 1,
wherein the information processing apparatus is configured as a mobile terminal with the sensor.

15. The information processing apparatus according to claim 14,
wherein the mobile terminal is a head mounted display capable of executing an AR application.

16. An information processing method, comprising:
restricting a size of an environment map data in which a virtual object is arranged, based on a detection result by a sensor of a real space associated with the environment map data, wherein
    the detection result includes a position of a person object detected by the sensor and a stay time of the person object detected by the sensor, and
    the environment map data is data indicating a three-dimensional structure; and
restricting a range of the environment map data, based on the position of the person object and the stay time of the person object, wherein the range of the environment map data is restricted in a vertical direction based on a visual field range at the position of the person object.

17. A non-transitory computer-readable medium having stored thereon, computer-executable instructions which, when executed by a processor, cause a computer to execute operations, the operations comprise:
- restricting a size of an environment map data in which a virtual object is arranged, based on a detection result by a sensor of a real space associated with the environment map data, wherein
  - the detection result includes a position of a person object detected by the sensor and a stay time of the person object detected by the sensor, and
  - the environment map data is data indicating a three-dimensional structure; and
- restricting a range of the environment map data, based on the position of the person object and the stay time of the person object, wherein
  - the range of the environment map data is restricted in a vertical direction based on a visual field range at the position of the person object.

* * * * *